United States Patent
Morita et al.

(10) Patent No.: US 9,753,452 B2
(45) Date of Patent: Sep. 5, 2017

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC Corporation, Yamanashi (JP)

(72) Inventors: Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 129 days.

(21) Appl. No.: 14/885,416

(22) Filed: Oct. 16, 2015

(65) Prior Publication Data

US 2016/0116909 A1 Apr. 28, 2016

(30) Foreign Application Priority Data

Oct. 17, 2014 (JP) .................................. 2014-213002
Dec. 26, 2014 (JP) .................................. 2014-266636

(51) Int. Cl.
*G05B 19/416* (2006.01)
*G05B 19/18* (2006.01)

(52) U.S. Cl.
CPC ....... *G05B 19/4163* (2013.01); *G05B 19/186* (2013.01); *G05B 2219/43006* (2013.01);
(Continued)

(58) Field of Classification Search
CPC G05B 19/186; G05B 19/416; G05B 19/4163; G05B 19/4166;
(Continued)

(56) References Cited

U.S. PATENT DOCUMENTS 6,008,609 A 12/1999 Sawashima et al.
2006/0210370 A1* 9/2006 Mizukami ............ G05B 19/186
409/66

(Continued)

FOREIGN PATENT DOCUMENTS

CN 102785125 A 11/2012
CN 103092131 A 5/2013
(Continued)

*Primary Examiner* — Dennis M Butler
(74) *Attorney, Agent, or Firm* — Hauptman Ham, LLP

(57) ABSTRACT

A machine tool controller including a numerical control section, a spindle-axis control section and a feed-axis control section. The spindle-axis control section includes a section for making the spindle axis perform an accelerated rotation at maximum capacity from a process start position toward a target thread depth, with a maximum rotation speed set as a target value; a section for detecting a maximum acceleration during the accelerated rotation based on a rotational position; a section for detecting a residual rotation amount from a current position to the target thread depth, based on a total rotation amount and the rotational position; a section for detecting a current speed based on the rotational position; and a section for making the spindle axis perform a decelerated rotation at maximum capacity to reach the target thread depth after the accelerated rotation, based on the maximum acceleration, the residual rotation amount and the current speed.

14 Claims, 10 Drawing Sheets

(52) U.S. Cl.
CPC ............. *G05B 2219/45216* (2013.01); *G05B 2219/50226* (2013.01)

(58) Field of Classification Search
CPC ........... G05B 2219/43006; G05B 2219/45216; G05B 2219/50225; G05B 2219/50226
See application file for complete search history.

(56) References Cited

U.S. PATENT DOCUMENTS

| | | | | |
|---|---|---|---|---|
| 2013/0204427 | A1* | 8/2013 | Terada | G05B 19/19 700/192 |
| 2013/0226355 | A1* | 8/2013 | Ueno | G05B 19/18 700/280 |
| 2015/0081084 | A1 | 3/2015 | Nishiwaki et al. | |

FOREIGN PATENT DOCUMENTS

| | | |
|---|---|---|
| JP | 9-120310 A | 5/1997 |
| JP | 2629729 B2 | 7/1997 |
| JP | 2001134321 A | 5/2001 |
| JP | 2002283184 A | 10/2002 |
| JP | 2003-181722 A | 7/2003 |
| JP | 3553741 B | 8/2004 |
| JP | 2005-216135 A | 8/2005 |
| JP | 4014485 B2 | 11/2007 |
| JP | 2011183481 A | 9/2011 |
| JP | 2011-212788 A | 10/2011 |
| WO | 2013/183082 A1 | 12/2013 |

* cited by examiner

DEVICE AND METHOD OF CONTROLLING MACHINE TOOL, TO CONTROL SYNCHRONIZED OPERATION OF SPINDLE AXIS AND FEED AXIS

RELATED APPLICATIONS

The present application claims priority to Japanese Application Number 2014-213002 filed Oct. 17, 2014 and Japanese Application Number 2014-266636 filed Dec. 26, 2014, the disclosures of which is hereby incorporated by reference herein in its entirety.

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle axis (or a principal axis) and a feed axis, various kinds of configurations for improving machining accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the output characteristics of the spindle axis, and controls the spindle axis based on the acceleration and deceleration command to improve the response of the spindle axis, so as to reduce cycle time.

SUMMARY OF THE INVENTION

In a machine tool capable of performing a tapping process by a synchronized operation of a spindle axis and a feed axis, cycle time is generally determined depending on the acceleration capacity of the spindle axis. It is desirable to accomplish the reduction of cycle time by executing a control capable of maximizing the acceleration capacity of the spindle axis with a simple configuration, without performing a preliminary work requiring a high-level skill, such as a parameter setting or adjustment, etc., required for the numerical control unit to prepare acceleration and deceleration commands in conformity with the output characteristics of the spindle axis.

One aspect of the invention is a controller of a machine tool, configured to control a synchronized operation of a spindle axis and a feed axis, the controller including a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position of the spindle axis. The numerical control section includes a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section. The spindle-axis control section includes an initial-motion control section configured to make the spindle axis perform an accelerated rotation at maximum capacity, from the process start position toward the target thread depth, with the maximum rotation speed set as a target value; a maximum-acceleration detecting section configured to detect a maximum acceleration during the accelerated rotation at maximum capacity, based on the rotational position of the spindle axis; a residual rotation-amount detecting section configured to detect a residual rotation amount of the spindle axis during a period when the spindle axis operates from a current position to the target thread depth, based on the total rotation amount and the rotational position of the spindle axis; a current-speed detecting section configured to detect a current speed of the spindle axis based on the rotational position of the spindle axis; and a positioning-motion control section configured to make the spindle axis perform a decelerated rotation at maximum capacity so as to reach the target thread depth, after the accelerated rotation at maximum capacity, based on the maximum acceleration, the residual rotation amount and the current speed.

Another aspect of the invention is a method of controlling a machine tool, configured to control a synchronized operation of a spindle axis and a feed axis, the method including the acts, executed by a controller, of obtaining, from a tapping program, a total rotation amount and a maximum rotation speed of the spindle axis during a period when the spindle axis operates from a process start position to a target thread depth; making the spindle axis perform an accelerated rotation at maximum capacity, from the process start position toward the target thread depth, with the maximum rotation speed set as a target value; detecting a maximum acceleration during the accelerated rotation at maximum capacity, based on a rotational position feedback of the spindle axis; detecting a residual rotation amount of the spindle axis during a period when the spindle axis operates from a current position to the target thread depth, based on the total rotation amount and the rotational position feedback; detecting a current speed of the spindle axis based on the rotational position feedback; and making the spindle axis perform a decelerated rotation at maximum capacity so as to reach the target thread depth, after the accelerated rotation at maximum capacity, based on the maximum acceleration, the residual rotation amount and the current speed.

The controller according to one aspect is configured so that, when the spindle axis is made to perform a cutting motion from the process start position to the target thread depth, the numerical control section instructs only the total rotation amount and the maximum rotation speed of the spindle axis as the spindle axis command to the spindle-axis control section; the spindle-axis control section performs, in accordance with the spindle axis command, the cutting motion by accelerating the spindle axis with a maximum power using a maximum permissible current, aiming at the maximum rotation speed, and continually performs, based on the maximum acceleration during the accelerating step and the successively detected residual rotation amount and current speed of the spindle axis, the cutting motion up to the target thread depth in the shortest time by decelerating the spindle axis at the maximum deceleration so as to make the spindle axis reach the target thread depth. Accordingly, it is no longer necessary to perform a parameter setting or adjustment, etc., required for the numerical control section to prepare acceleration and deceleration commands in conformity with the output characteristics of the spindle axis, and it is possible, with a simple configuration, to reduce the cycle time of a tapping process by executing an acceleration and deceleration control that can maximize the acceleration capacity of the spindle axis.

In the control method according to the other aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
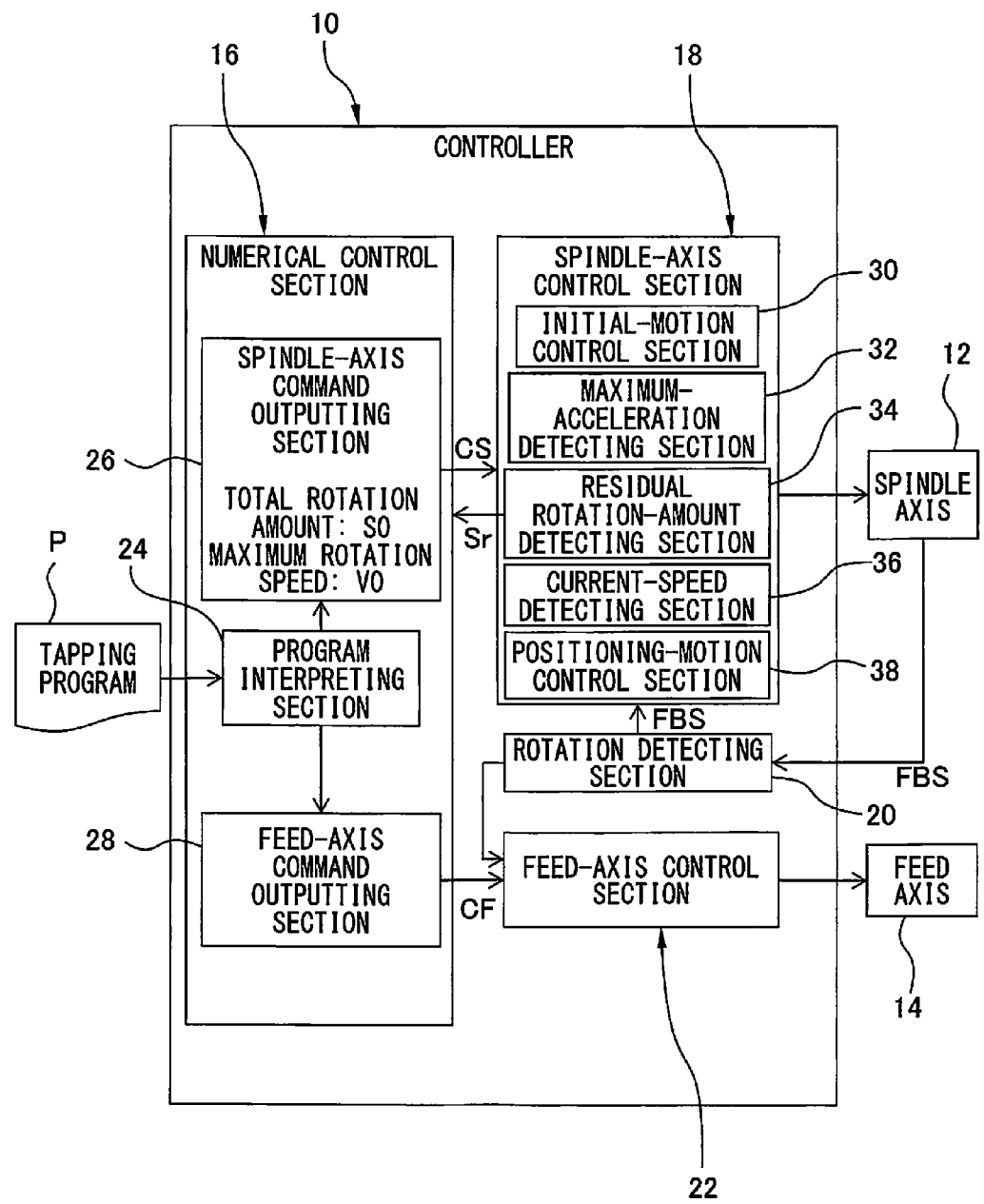
FIG. 1 is a functional block diagram showing a configuration of one embodiment of a machine tool controller.

Embodiments of the present invention will be described below with reference to the accompanying drawings. Throughout the drawings, corresponding components are denoted by common reference numerals.

FIG. 1 is a functional block diagram showing a configuration of a machine tool controller 10 according to one embodiment. The controller 10 controls a synchronized operation in a machine tool (e.g., lathe, drilling machine, machining center, and the like) for performing a tapping process by the synchronized operation of a spindle axis 12 and a feed axis 14, in such a manner that the feed axis 14 is operated to follow the rotational motion of the spindle axis 12 by taking into account the thread pitch designated by a tapping program P. Though not illustrated, the spindle axis 12 is a control axis provided for a drive unit, such as a spindle motor, that turns a clamp unit holding a workpiece or a tool at a necessary speed for machining. Though not illustrated, the feed axis 14 is a control axis provided for a drive unit, such as a servo motor, that feeds a support unit supporting a workpiece or a tool at a necessary speed for machining. For example, in a lathe, the tool may be linearly moved along the feed axis 14 relative to the workpiece being turned on the spindle axis 12, or the workpiece turned by the spindle axis 12 may be linearly moved relative to the tool along the feed axis. In a drilling machine, the rotating tool on the spindle axis 12 may be linearly moved relative to the workpiece along the feed axis 14, or the workpiece may be linearly moved along the feed axis 14 relative to the rotating tool on the spindle axis 12. In any of the cases, the feed axis 14 that has a relatively wide margin of acceleration and deceleration torque during operation is moved so as to follow the spindle axis 12 that has a relatively less margin of acceleration and deceleration torque during operation, whereby it is possible to reduce synchronization error and improve machining accuracy. It should be noted that in the present invention the configuration of the machine tool is not particularly limited.

The controller 10 includes a numerical control section 16 configured to prepare a spindle-axis command CS and a feed-axis command based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare a spindle-axis command CS in accordance with the interpretation of the program interpreting section 24 and send the spindle-axis command CS to the spindle axis control section 18; and a feed-axis command outputting section 28 configured to prepare a feed-axis command CF in accordance with the interpretation of the program interpreting section 24 and send the feed-axis command CF to the feed-axis control section 22. The numerical control section 16 may include a well-known hardware configuration for CNC apparatus.

Before start of a tapping process, the spindle-axis command outputting section 26 obtains, from the designated value interpreted by the program interpreting section 24 from the tapping program P, a total rotation amount S0 and a maximum rotation speed V0 of the spindle axis 12 during a period when the spindle axis operates from a process start position (rotational position) to a target thread depth (rotational position), and sends the total rotation amount S0 and the maximum rotation speed V0 as the spindle-axis command CS to the spindle-axis control section 18. For example, when the tapping program P includes instructions for machining a female thread having a thread pitch of 1.25 mm and a thread depth of 30 mm with the maximum rotation speed V0 of the spindle axis 12 set at 3000/min, the total rotation amount S0 of the spindle axis 12 from the process start position to the target thread depth, is calculated as 30÷1.25=24 (rev). Accordingly, the spindle-axis command outputting section 26 notifies the spindle-axis control section 18 of V0=3000 (min$^{-1}$) and S0=24 (rev). In this way, spindle-axis command CS includes no position command and no acceleration and deceleration command for making the spindle axis 12 rotate to the target thread depth.

The spindle-axis control section 18, based on a rotational position (a feedback value; hereinafter referred to as a rotational position FBS) of the spindle axis 12 detected by the rotation detecting section 20, controls the rotational motion of the spindle axis 12 by usual feedback control. The feed-axis control section 22, using the rotational position FBS of the spindle axis 12 in addition to the feedback value of the feed position of the feed axis 14, controls the feed motion of the feed axis 14 following the motion of the spindle axis 12 by feedback control. The rotation detecting section 20 can obtain the rotational position FBS from a position detector (not shown) such as an encoder or the like for detecting the operational position of the drive unit of the spindle axis 12.

The spindle-axis control section 18 includes an initial-motion control section 30 configured to make the spindle axis 12 perform an accelerated rotation at maximum capacity, with the maximum rotation speed V0 (min$^{-1}$) sent from spindle-axis command outputting section 26 set as a target value, from the process start position toward the target thread depth; a maximum-acceleration detecting section 32 configured to detect a maximum acceleration A0 (min$^{-1}$/s) during the accelerated rotation at maximum capacity, based on the rotational position FBS; a residual rotation-amount detecting section 34 configured to detect a residual rotation amount Sr (rev) of the spindle axis 12 during a period when the spindle axis operates from a current position (rotational position) to the target thread depth, based on the total rotation amount S0 (rev) sent from the spindle-axis command outputting section 26 and the rotational position FBS; a current-speed detecting section 36 configured to detect a current speed Vc (min$^{-1}$) of the spindle axis 12 based on the rotational position FBS; and a positioning-motion control section 38 configured to make the spindle axis 12 perform a decelerated rotation at maximum capacity so as to reach the target thread depth after the accelerated rotation at maximum capacity, based on the maximum acceleration A0, the residual rotation amount Sr and the current speed Vc. In one embodiment, the positioning-motion control section 38 can be configured to make the spindle axis 12 perform a decelerated rotation at maximum capacity and stop at the target depth.

Figure 2:
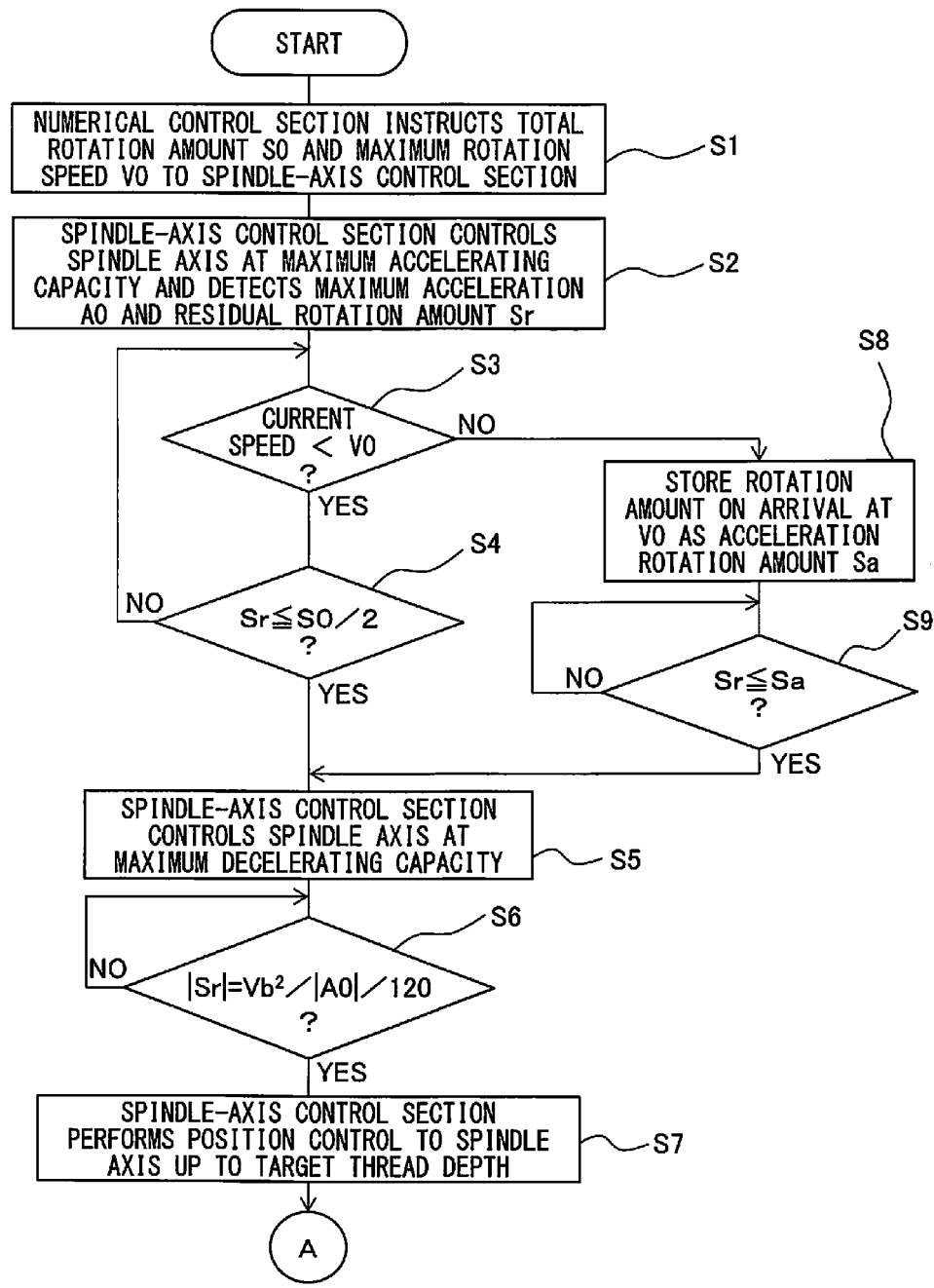
FIG. 2 is a flow chart for showing a cutting motion control method for a tapping process, which is one embodiment of a machine tool control method.

FIG. 2 shows a cutting motion control method for the spindle axis 12 in a tapping process, as one embodiment of a machine tool control method executed by the controller 10. The details of the configuration of the controller 10 will be described below in detail, with reference to the tapping control flow illustrated in FIG. 2. First, at step S1, the numerical control section 16 (spindle-axis command outputting section 26) instructs the total rotation amount S0 and maximum rotation speed V0 of the spindle axis 12 to the spindle-axis control section 18. At step S2, the spindle-axis control section 18 (initial-motion control section 30, maximum-acceleration detecting section 32, residual rotation-amount detecting section 34) accelerates rotation of the spindle axis 12, aiming at the maximum rotation speed V0 as a target speed, by the maximum capacity using the maximum permissible current of the drive source to perform tapping from the process start position, and detects the maximum acceleration A0 during this period and also successively detects the residual rotation amount Sr at the current position. The detected residual rotation amount Sr is notified to the numerical control section 16 by spindle-axis control section 18 every time it is detected.

Next, at step S3, the spindle-axis control section 18 (current-speed detecting section 36) successively detects the current speed Vc during the accelerated rotation at maximum capacity, and judges whether or not the current speed Vc has reached the maximum rotation speed V0 every time it is detected. When Vc has not yet reached V0, at step S4, the spindle-axis control section 18 judges whether or not the residual rotation amount Sr is equal to or less than the half of the total rotation amount S0. When Sr is equal to or less than the half of S0, at step S5, the spindle-axis control section 18 makes the spindle axis 12 perform a decelerated rotation at maximum capacity using the maximum permissible current of the drive source to continue tapping. When Sr is not equal to or less than the half of S0, the control returns to step S3.

Figure 3:
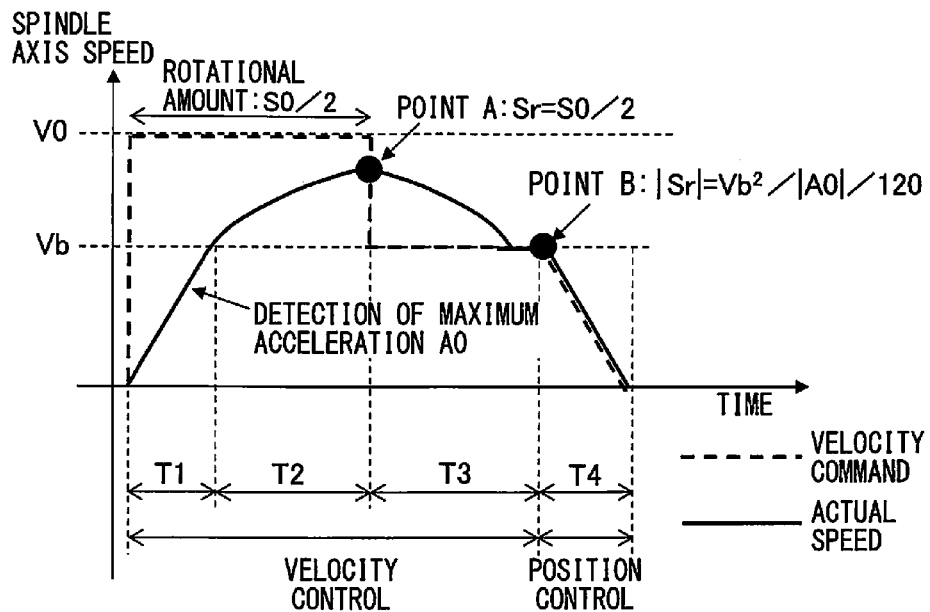
FIG. 3 is a diagram showing one example of the motion of a spindle axis in the embodiment shown in FIG. 2.

Referring now to FIG. 3, a speed-time curve is provided to depict the motion of the spindle axis 12 when the residual rotation amount Sr reaches the half of the total rotation amount S0 before the current speed Vc has reached the maximum rotation speed V0 (in the case where judgments at steps S3 and S4 are both YES). In FIG. 3, Vb is previously determined for the spindle axis 12, as a rotational speed (e.g., the base speed of the spindle motor) to which the spindle axis can be accelerated from the start of operation by a fixed torque (therefore, at a constant acceleration), and can be stored as one of control parameters into an unillustrated memory of the controller 10. In practice, the speed Vb may take any value equal to or less than the base speed of the spindle motor (a speed converted by taking into account a reduction ratio, if any, between the spindle motor and the spindle axis 12).

The accelerated rotation of the spindle axis 12 at maximum capacity at step S2 is performed during time periods T1 and T2 in FIG. 3, and the maximum acceleration A0 is detected during the constant acceleration in time period T1. When the rotational speed of the spindle axis 12 exceeds Vb, the acceleration of the spindle axis 12 gradually decreases from the maximum acceleration A0 due to the characteristics of the spindle motor, for example. At a point A (when the judgment at step S4 has become Yes) when the residual rotation amount Sr reaches the half of the total rotation amount S0 (in other words, when the rotation amount from the process start reaches the half of the total rotation amount S0), the motion of the spindle axis 12 changes from accelerated rotation to decelerated rotation, and the spindle axis 12 is decelerated at maximum capacity at step S5, in time period T3. In time period T3 the rotation of spindle axis 12 is decelerated toward the speed Vb as a target value from the point A. During this period, the deceleration of the spindle axis 12 is gradually increased due to the characteristics of the spindle motor, for example. Also during the period of decelerated rotation at maximum capacity, the spindle-axis control section 18 (residual rotation-amount detecting section 34, current-speed detecting section 36) successively detects the residual rotation amount Sr at the current position of the spindle axis 12 and the current speed Vc. In this way, in time periods T1 to T3, the spindle-axis control section 18 performs velocity control to the spindle axis 12 (step-wise speed instructions are illustrated by the broken line).

After step S5, the spindle-axis control section 18 (positioning-motion control section 38) monitors the successively detected residual rotation amount Sr (rev) and the current speed Vc (min⁻¹) and determines the position of a point B (FIG. 3) at which the residual rotation amount Sr is expected to become equal to 0 (or the spindle axis reaches the target thread depth) when the spindle axis is decelerated from the current speed Vc (min⁻¹) at the maximum deceleration A0 (negative value) corresponding to the maximum acceleration A0 (min⁻¹/s). This position can be determined as the absolute value of the residual rotation amount Sr (negative value) from the point of Sr=0, by the following equation:

$$|Sr|=Vc^2/|A0|/120;$$

based on a formula: $(Vc/60)^2=2\times|A0|/60\times|Sr|$.

In this embodiment, it is assumed that the spindle axis 12 is decelerated at the fixed maximum deceleration A0 from the point B. Accordingly, it is assumed that the current speed Vc of the spindle axis 12 has reached Vb at the point B. In other words, |Sr| or the position of the point B can be determined as:

$$|Sr|=Vb^2/|A0|/120.$$

It is also assumed in this embodiment that the torque necessary for acceleration (hereinafter referred to as an acceleration torque) of the spindle axis 12 and the torque necessary for deceleration (hereinafter referred to as a deceleration torque) are equal to each other. In general, load (resistance) attributed to mechanism structure arises while spindle axis 12 is rotating so that a greater torque is needed for acceleration than for deceleration. Therefore, when the acceleration torque is equal to the deceleration torque, it takes a longer time in acceleration at maximum capacity than that in deceleration at maximum capacity when the same speed change needs to be made. Accordingly, the spindle axis 12 that is decelerated from the point A reaches the speed Vb in a shorter period than time T2. The position |Sr| at this point is $|Sr|>Vc^2/|A0|/120$. Thereafter, the spindle axis is rotated at the fixed speed Vb for a very short time to reach the point B of $|Sr|=Vb^2/|A0|/120$ (FIG. 3).

Turning back to FIG. 2, at step S6, the spindle-axis control section 18 (positioning-motion control section 38) judges whether or not the absolute value |Sr| of the residual rotation amount at the current position of the spindle axis 12 satisfies $|Sr|=Vb^2/|A0|/120$ (i.e., whether or not the rotational position of the spindle axis 12 has reached the point B). When $|Sr|=Vb^2/|A0|/120$ is satisfied, at step S7, the spindle-axis control section 18 (positioning-motion control section 38) prepares a command (in one embodiment, a command for stopping the spindle axis at the target thread depth) for decelerating rotation of the spindle axis 12 at the maximum deceleration A0 to make the spindle axis reach the point of Sr=0 (the target thread depth). When $|Sr|=Vb^2/|A0|/120$ is not satisfied, the same judgment is repeated until this equation holds. The spindle axis 12, in accordance with the command from the spindle-axis control section 18 (positioning-motion control section 38), performs tapping from the point B toward the target thread depth as decelerating the rotation at the maximum deceleration A0, and reaches the target thread depth when Sr becomes equal to 0 (in one embodiment, the spindle axis is stopped at the target thread depth). In this way, during time period T4 (FIG. 3) from the point B until the spindle axis reaches the target thread depth, the spindle-axis control section 18 performs position control to the spindle axis 12 (the velocity command at a constant acceleration is shown by the broken line).

When at step S3 the current speed Vc is judged to have reached the maximum rotation speed V0, at step S8, the spindle-axis control section 18 stores the rotation amount (i.e., the rotational position FBS) of the spindle axis 12 from the process start position until the spindle axis reaches the maximum rotation speed V0, as the acceleration rotation amount Sa. Then, at step S9, the spindle-axis control section 18 judges whether or not the residual rotation amount Sr is equal to or less than the acceleration rotation amount Sa. When Sr is equal to or less than Sa, the control goes to step S5, and subsequently executes steps S6 and S7 to perform machining up to the target thread depth. When Sr is greater than Sa, the judgment is repeated until Sr becomes equal to or less than Sa.

While the spindle-axis control section 18 is controlling the rotational motion of the spindle axis 12 from the process start position to the target thread depth, the feed-axis control section 22 controls a feed motion of the feed axis 14 so as to follow the motion of the spindle axis 12, based on the rotational position FBS of the spindle axis 12. While the spindle-axis control section 18 is executing the process from step S1 to step S9, the numerical control section 16 monitors the residual rotation amount Sr notified from the spindle-axis control section 18 and determines that the tapping process has reached the target thread depth when the residual rotation amount Sr becomes equal to or less than a first predetermined value (a very small value close to zero).

Figure 4:
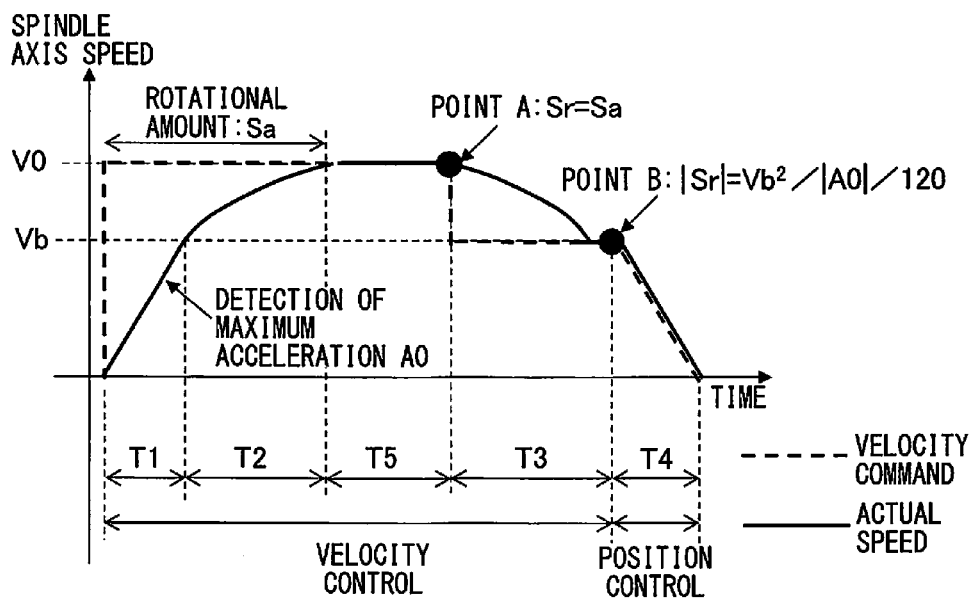
FIG. 4 is a diagram showing another example of the motion of the spindle axis in the embodiment shown in FIG. 2.

FIG. 4 shows a speed-time curve of the motion of the spindle axis 12 when the current speed Vc reaches the maximum rotation speed V0 before the residual rotation amount Sr reaches the half of the total rotation amount S0 (in the case where judgment at step S3 is No). As shown in FIG. 4, the accelerated rotation of the spindle axis 12 at maximum capacity at step S2 is performed in time periods T1 and T2 so that the current speed Vc of the spindle axis 12 reaches the maximum rotation speed V0. Then, the spindle axis 12 rotates at the fixed speed V0 over time period T5 to continue tapping. At the point of time A when the residual rotation amount Sr becomes equal to the acceleration rotation amount Sa (the point of time when judgment at S9 becomes YES), the motion of the spindle axis 12 changes from accelerated rotation to decelerated rotation, and the spindle axis 12 is decelerated at maximum capacity at step S5 in time period T3. In time period T4, position control to the spindle axis 12 at step S7 is performed. In time periods T1, T2, T3 and T4, the spindle axis 12 operates in the same manner as that shown in FIG. 3.

In the configurations shown in FIGS. 3 and 4, it is assumed that the maximum rotation speed V0 of the spindle axis 12 is greater than the previously determined speed Vb (e.g., the base speed of the spindle axis). In contrast, in some machine tool configurations, the maximum rotation speed V0 of the spindle axis 12 may be smaller than the speed Vb. In this case, time periods T2 and T3 in FIGS. 3 and 4 are omitted, and the spindle axis 12 operates at a constant acceleration and deceleration from the process start position to the target thread depth.

Figure 5:
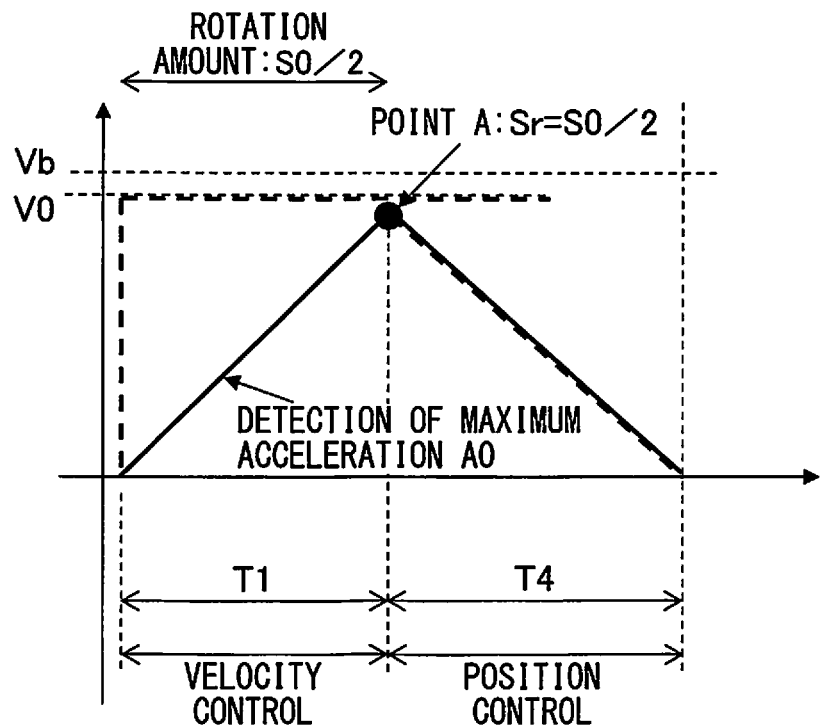
FIG. 5 is a diagram showing still another example of the motion of the spindle axis in the embodiment shown in FIG. 2.

FIG. 5 shows a speed-time curve of the motion of the spindle axis 12 when the residual rotation amount Sr reaches the half of the total rotation amount S0 before the current speed Vc reaches the maximum rotation speed V0 (<Vb) (in the case where judgments at steps S3 and S4 are both YES). As shown in the drawing, the spindle axis 12 executes only the motions in time periods T1 and T4 in FIG. 3. In other words, rotation of the spindle axis 12 is accelerated at the maximum acceleration A0 toward the maximum rotation speed V0 as a target value in time period T1, and when Sr reaches the half of S0 or at the point of time A, the spindle axis 12 changes its mode from acceleration to deceleration, and performs decelerated rotation at the maximum deceleration A0 in time period T4, from the point A to the position where the residual rotation amount Sr=0. While the spindle axis 12 is performing decelerated rotation, the spindle-axis control section 18 (positioning-motion control section 38) performs position control to the spindle axis 12 alone.

Figure 6:
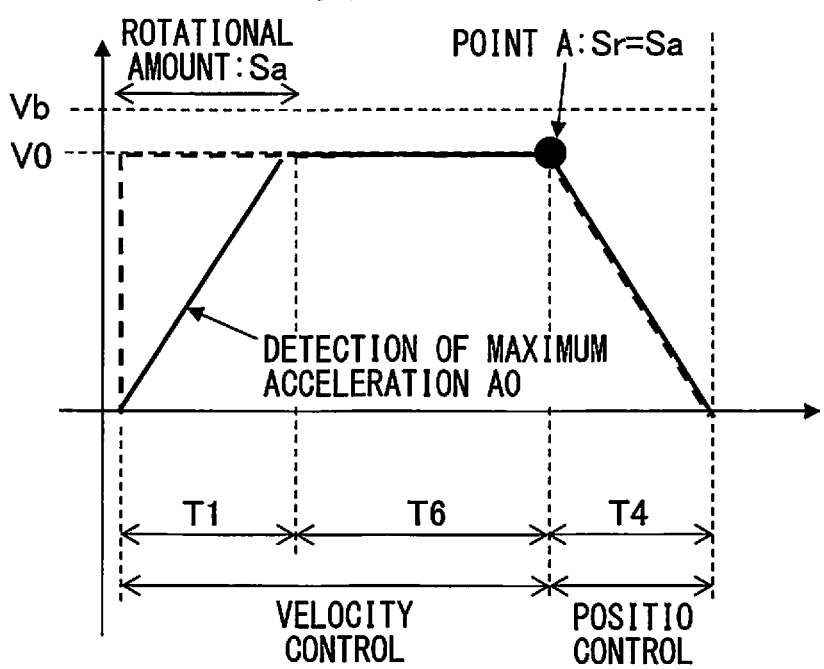
FIG. 6 is a diagram showing a further example of the motion of the spindle axis in the embodiment shown in FIG. 2.

FIG. 6 shows a speed-time curve of the motion of the spindle axis 12 when the current speed Vc reaches the maximum rotation speed V0 (<Vb) before the residual rotation amount Sr reaches the half of the total rotation amount S0 (in the case where judgment at step S3 is No). As shown in the drawing, the spindle axis 12 performs the motions corresponding to time periods T1 and T4 in FIG. 4 and the motion corresponding to T5 in FIG. 4. In other words, rotation of the spindle axis 12 is accelerated at the maximum acceleration A0 toward the maximum rotation speed V0 as a target value in time period T1. After reaching the maximum rotation speed V0, the spindle axis rotates at the fixed speed V0 in time period T6 until the point A where the residual rotation amount Sr becomes equal to the acceleration rotation amount Sa. Then, in time period T4, from the point A to the position where the residual rotation amount Sr becomes 0, the spindle axis performs decelerated rotation at the maximum deceleration A0. While the spindle axis 12 is performing fixed speed rotation and decelerated rotation, the spindle-axis control section 18 (positioning-motion control section 38) performs position control to the spindle axis 12 alone.

Figure 7:
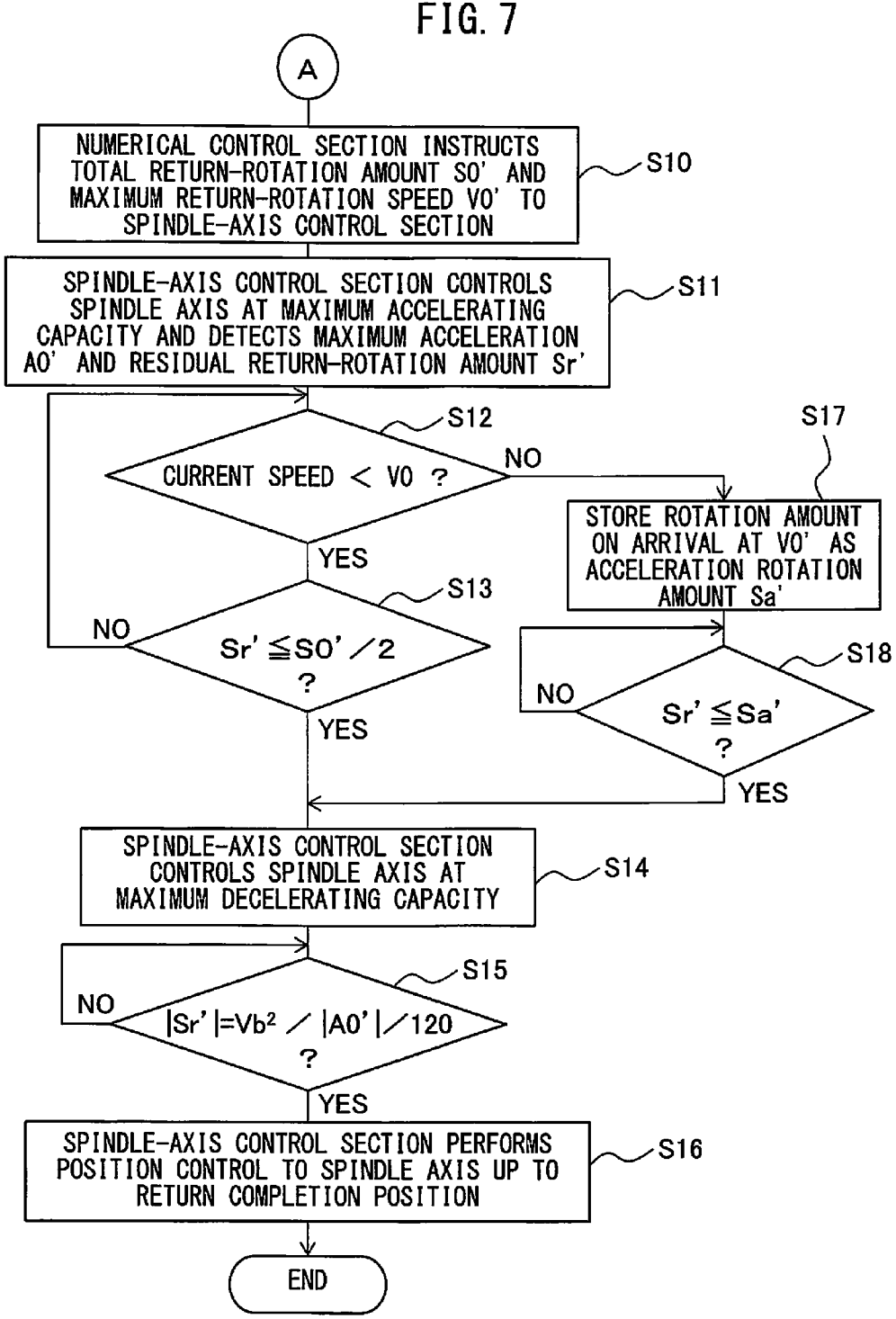
FIG. 7 is a flow chart for showing a return motion control method for a tapping process, which is one embodiment of a machine tool control method.

In a tapping process using a machine tool, it is necessary to perform a return motion for pulling out the tool from the workpiece after a prepared hole of a target thread depth has been machined in the workpiece. In the above embodiment, when the positioning-motion control section 38 is configured to make the spindle axis 12 perform a decelerated rotation at maximum capacity and stop at the target thread depth, the controller 10 can control the return motion in a similar manner to that of the control of machining to the target thread depth. FIG. 7 shows a method of controlling a return motion of the spindle axis 12 in tapping as one embodiment of a machine tool control method performed by the controller 10. Referring to FIG. 7, one example of a control flow of a return motion by the controller 10 will be described below.

At step 10, the numerical control section 16 (spindle-axis command outputting section 26), after determining that the tapping process has reached a target thread depth in the process flow shown in FIG. 2, obtains, from the command values of the tapping program P interpreted by the program interpreting section 24, a total return-rotation amount S0' and a maximum return-rotation speed V0' of the spindle axis 12 during the period when the spindle axis operates from the target thread depth to a return completion position, and sends the total return-rotation amount S0' and the maximum return-rotation speed V0' as a spindle-axis command CS to the spindle-axis control section 18. The spindle-axis command CS of the return motion does not include either the position command or the acceleration and deceleration command for performing rotational motion of the spindle axis 12 to the return completion position. The return completion position may be either the same as or different from the process start position. When the return completion position coincides with the process start position, the total return-rotation amount S0' is equal to the total rotation amount S0 during machining, but the maximum return-rotation speed V0' does not always coincide with the maximum rotation speed V0 during machining.

At step S11, the spindle-axis control section 18 (initial-motion control section 30, maximum-acceleration detecting section 32 and residual rotation-amount detecting section 34) performs the following processes. The initial-motion control section 30 makes the spindle axis 12 perform an accelerated inverse rotation at maximum capacity using the maximum permissible current of the drive source, with the maximum return-rotation speed V0' set as a target value, from the target thread depth toward the return completion position. The maximum-acceleration detecting section 32 detects a maximum acceleration A0' of inverse rotation during the accelerated inverse rotation at maximum capacity, based on the rotational position FBS. The residual rotation-amount detecting section 34 successively detects a residual return-rotation amount Sr' of the spindle axis 12 during the period when the spindle axis operates from the current position to the return completion position, based on the total return-rotation amount S0' and the rotational position FBS. The detected residual return-rotation amount Sr' is notified to the numerical control section 16 by the spindle-axis control section 18 every time it is detected.

Next, at step S12, the spindle-axis control section 18 (current-speed detecting section 36) successively detects a current speed Vc' of inverse rotation of the spindle axis based on the rotational position FBS during the accelerated inverse rotation at maximum capacity, and judges whether or not the current Vc' reaches the maximum return-rotation speed V0' every time the detection is performed. When Vc' has not reached V0', the spindle-axis control section 18 judges at step S13 whether or not the residual return-rotation amount Sr' is equal to or less than the half of the total return-rotation amount S0'. When Sr' is equal to or less than the half of S0', at step S14, the spindle-axis control section 18 makes the spindle axis 12 continue to perform a decelerated inverse rotation at maximum capacity using the maximum permissible current of the drive source. When Sr' is not equal to or less than the half of S0', the control returns to step S12.

Next, at step S15, the spindle-axis control section 18 (positioning-motion control section 38) judges whether or not the absolute value |Sr'| of the residual return-rotation amount Sr' at the current position of the spindle axis 12 satisfies $|Sr'|=Vb^2/|A0'|/120$. When $|Sr'|=Vb^2/|A0'|/120$ is satisfied, at step S16, the spindle-axis control section 18 (positioning-motion control section 38) prepares a command for stopping the spindle axis 12 at the point where Sr'=0 (or the return completion position) by making the spindle axis 12 perform a decelerated inverse rotation at maximum deceleration A0', and performs position control to the spindle axis 12 based on this command. When $|Sr'|=Vb^2/|A0'|/120$ does not hold, the same judgment is repeated until this equation is satisfied. The spindle axis 12, in accordance with the command from the spindle-axis control section 18 (positioning-motion control section 38), performs decelerated inverse rotation at maximum deceleration A0' and stops when Sr' becomes equal to 0.

When it is determined at step S12 that the current Vc' has reached the maximum return-rotation speed V0', at step S17, the spindle-axis control section 18 stores the rotation amount (i.e., the rotational position FBS) of the spindle axis 12 from the target thread depth when the current reaches the maximum return-rotation speed V0', as the acceleration rotation amount Sa'. Then, at step S18, the spindle-axis control section 18 judges whether or not the residual return rotation amount Sr' is equal to or less than the acceleration rotation amount Sa'. When Sr' is equal to or less than Sa', the control goes to step S14, and then executes steps S15 and S16 to perform a return motion to the return completion position. When Sr' is greater than Sa', the judgment is repeated until Sr' becomes equal to or less than Sa'.

The above return motion of the spindle axis 12 can be represented by a speed-time curve similar to the cutting motion shown in FIG. 3 or FIG. 4. When the total return-rotation amount S0' and the maximum return-rotation speed V0' are equal to the total rotation amount S0 and the maximum rotation speed V0 at the time of cutting, respectively, the cutting motion and the return motion practically show the same speed-time curve. On the other hand, when the total return-rotation amount S0' and the maximum return-rotation speed V0' are different from the total rotation amount S0 and the maximum rotation speed V0 at the time of cutting, respectively, the cutting motion and the return motion do not always show the same speed-time curve.

While the spindle-axis control section 18 is controlling the inverse rotation of the spindle axis 12 from the target thread depth to the return completion position, the feed-axis control section 22 makes the feed axis 14 perform an inverse feed motion so as to follow the motion of the spindle axis 12, based on the rotational position FBS of the spindle axis 12. While the spindle-axis control section 18 is executing the process from step S10 to step S18, the numerical control section 16 monitors the residual return-rotation amount Sr' notified from the spindle-axis control section 18 and determines that the return motion is completed and the tool has been pulled out from the workpiece when the residual return-rotation amount Sr' becomes equal to or less than a second predetermined value (a very small value close to zero).

The controller 10 according to the above embodiment is configured so that, when the spindle axis 12 is made to perform a cutting motion from the process start position to the target thread depth, the numerical control section 16 sends the total rotation amount S0 and the maximum rotation speed V0 of the spindle axis 12 alone as the spindle axis command CS to the spindle-axis control section 18; the spindle-axis control section 18, in accordance with this spindle axis command CS, performs the cutting motion by accelerating the spindle axis 12 with the maximum power using the maximum permissible current, aiming at the maximum rotation speed V0, and based on the maximum acceleration A0 during the acceleration period, the successively detected residual rotation amount Sr and current speed Vc of the spindle axis 12, decelerates the spindle axis 12 at the maximum deceleration A0 to thereby continue the cutting motion to the target thread depth in the shortest time so as to reach the target thread depth. Therefore, according to the controller 10, it is no longer necessary to perform parameter setting, adjustment and others to prepare acceleration and deceleration commands for the numerical control section 16 in conformity with the output characteristics of the spindle axis 12, hence, it is possible with a simpler configuration to shorten the cycle time of tapping by performing acceleration and deceleration control that can maximize the acceleration capacity of the spindle axis 12.

The controller 10 according to the above embodiment is configured so that, when the spindle axis 12 is made to perform a return operation from the target thread depth to the return completion position, the numerical control section 16 sends the total return-rotation amount S0' and the maximum return-rotation speed V0' of the spindle axis 12 alone as the spindle axis command CS to the spindle-axis control section 18; the spindle-axis control section 18, in accordance with this spindle axis command CS, performs the return motion by accelerating the spindle axis 12 with the maximum power using the maximum permissible current, aiming at the maximum return-rotation speed V0', and based on the maximum acceleration A0' during the acceleration period, the successively detected residual return-rotation amount Sr' and current speed Vc' of the spindle axis 12, decelerates the spindle axis 12 at the maximum deceleration A0' to thereby continue the return motion to the return completion position in the shortest time, and stop the spindle axis at the return complete position. Therefore, according to the controller 10, it is no longer necessary to perform parameter setting, adjustment and others to prepare acceleration and deceleration commands for the numerical control section 16 in conformity with the output characteristics of the spindle axis 12, hence, it is possible with a simpler configuration to shorten the cycle time of tapping by performing acceleration and deceleration control that can maximize the acceleration capacity of the spindle axis 12.

The configuration of the controller 10 of the above embodiment can be described as a machine tool control method for controlling a synchronized operation of the spindle axis 12 and the feed axis 14. This control method includes the acts, executed by the controller 10, of obtaining, from a tapping program P, a total rotation amount S0 and a maximum rotation speed V0 of the spindle axis 12 during the period when the spindle axis 12 operates from a process start position to a target thread depth; making the spindle axis 12 perform an accelerated rotation at maximum capacity, with the maximum rotation speed V0 set as a target value, from the process start position toward the target thread depth; detecting a maximum acceleration A0 during the accelerated rotation at maximum capacity, based on a rotational position feedback FBS of the spindle axis 12; detecting a residual rotation amount Sr of the spindle axis 12 during the period when the spindle axis operates from the current position to the target thread depth, based on the total rotation amount S0 and the rotational position feedback FBS; detecting a current speed Vc of the spindle axis 12 based on the rotational position feedback FBS; and making the spindle axis 12 perform a decelerated rotation at maximum capacity so as to reach the target thread depth, after the accelerated rotation at maximum capacity, based on the maximum acceleration A0, the residual rotation amount Sr and the current speed Vc. This configuration makes it possible to decelerate rotation of the spindle axis 12 at maximum capacity and stop the spindle axis at the target thread depth.

In this control method, the controller 10 further includes the acts of obtaining, from the tapping program P, a total return-rotation amount S0' and a maximum return-rotation speed V0' of the spindle axis 12 during the period when the spindle axis 12 operates from the target thread depth to the return completion position; making the spindle axis 12 perform an accelerated inverse rotation at maximum capacity, with a maximum return-rotation speed V0' set as a target value, from the target thread depth toward the return completion position; detecting a maximum acceleration A0' of inverse rotation during the accelerated inverse rotation at maximum capacity, based on the rotational position feedback FBS of the spindle axis 12; detecting a residual return-rotation amount Sr' of the spindle axis 12 during the period when the spindle axis operates from the current position to the return completion position, based on the total return-rotation amount S0' and the rotational position feedback FBS; detecting a current speed Vc' of inverse rotation of the spindle axis 12 based on the rotational position feedback FBS; and making the spindle axis 12 perform a decelerated inverse rotation at maximum capacity so as to return and stop at the return completion position, after an accelerated inverse rotation at maximum capacity, based on the maximum acceleration A0' of inverse rotation, the residual return-rotation amount Sr' and the current speed Vc' of inverse rotation.

Figure 8:
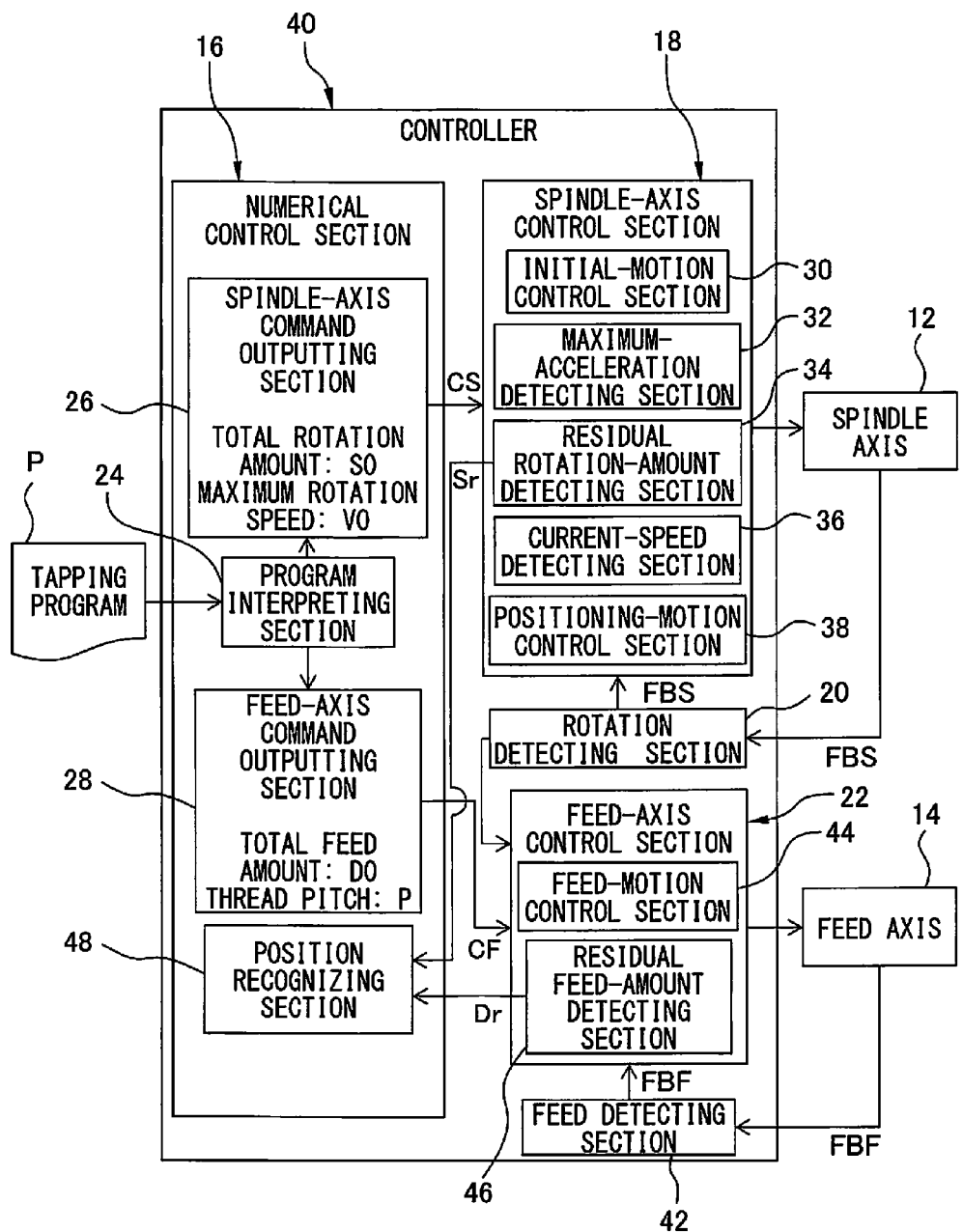
FIG. 8 is a functional block diagram showing the configuration of a modified example of the controller of FIG. 1.

In the tapping process using a machine tool, it is preferable that the controller continuously grasps the rotational position of the spindle axis and the feed position of the feed axis during tapping. FIG. 8 shows functional blocks of a configuration of a controller 40 according to a modified example in which a function of recognizing the positions of the spindle axis and the feed axis is added. The controller 40 includes the same configuration as that of the controller 10 in FIG. 1 except that a position recognizing function is added. Corresponding components are denoted by the same reference numerals and detailed description thereof is not repeated.

The controller 40 includes a numerical control section 16 configured to prepare a spindle-axis command CS and a feed-axis command based on a tapping program P; a spindle-axis control section 18 configured to control a rotational motion of a spindle axis 12 in accordance with the spindle-axis command CS; a rotation detecting section 20 configured to detect a rotational position of the spindle axis 12; a feed-axis control section 22 configured to control a feed motion of a feed axis 14 in accordance with the feed-axis command CF, based on the rotational position detected by the rotation detecting section 20; and a feed detecting section 42 configured to detect the feed position of the feed axis 14. A feed-axis command outputting section 28 of the numerical control section 16, before start of a tapping process, obtains, from the command values from the tapping program P interpreted by a program interpreting section 24, a total feed amount D0 (mm) of the feed axis 14 corresponding to a target thread depth and a thread pitch Pt (mm/rev), and sends the total feed amount D0 and the thread pitch Pt as the feed-axis command CF to the feed axis control section 22. In this way, the feed-axis command CF does not include either position command or acceleration and deceleration command for performing a feed motion of the feed axis 14 to the target thread depth.

The feed-axis control section 22 includes a feed-motion control section 44 configured to control a feed motion of the feed axis 14 based on the rotational position FBS of the spindle axis 12 detected by the rotation detecting section 20, the thread pitch Pt and the feed position (a feedback value; hereinafter referred to as feed position FBF) of the feed axis 14 detected by the feed detecting section 42; and a residual feed amount detecting section 46 configured to detect a residual feed amount Dr of the feed axis 14 from the current position to the target thread depth, based on the total feed amount D0 and the feed position FBF. The feed detecting section 42 can obtain the feed position FBF from the output of a position detector (not shown) such as an encoder or the like that detects the operating position of the drive unit of the feed axis 14.

The residual rotation-amount detecting section 34 of the spindle-axis control section 18 successively detects the residual rotation amount Sr at the current position of the spindle axis 12 while the spindle axis 12 is being made to perform a cutting motion from the process start position to the target thread depth, and notifies the residual rotation amount Sr to the numerical control section 16 every time it is detected. The residual feed amount detecting section 46 of the feed-axis control section 22 successively detects the residual feed amount Dr at the current position of the feed axis 14 while the feed axis 14 is being made to perform a feed motion from the process start position to the target thread depth, and notifies the residual feed amount Dr to the numerical control section 16 every time it is detected. Further, the feed-axis control section 22 notifies the initial position Di (feed position FBF) of the feed axis 14 to the numerical control section 16 at the start of processing.

The numerical control section 16 includes a position recognizing section 48 for recognizing the current position of the spindle axis 12 based on the residual rotation amount Sr and recognizing the current position of the feed axis 14 based on the residual feed amount Dr. The position recognizing section 48, based on the total rotation amount S0 of the spindle axis 12 obtained from the tapping program P and the residual rotation amount Sr of the spindle axis 12 notified from the spindle-axis control section 18, recognizes the current position of the spindle axis 12 as (S0−Sr). The position recognizing section 48, based on the total feed amount D0 of the feed axis 14 obtained from the tapping program P and the residual feed amount Dr and initial position Di of the feed axis 14 notified from the feed-axis control section 22, recognizes the current position of the feed axis 14 as (D0−Dr+Di).

In the controller 40 having the above configuration, the position recognizing section 48 of the numerical control section 16 can recognize the current positions of the spindle axis 14 and feed axis 14 even though the spindle-axis command CS prepared by the numerical control section 16 does not include either the position command or the acceleration and deceleration command of the spindle axis 12, the feed-axis command CF prepared by the numerical control section 16 does not include either the position command or the acceleration and deceleration command of the feed axis 14. Therefore, according to the controller 40, the numerical control section 16 as the superior controller of the spindle-axis control section 18 and feed-axis control section 22 for performing feedback control can constantly grasp or control the operated states of the spindle axis 12 and feed axis 14 during execution of tapping, hence can improve reliability of tapping process control.

In the controller 40, it is similarly possible for the position recognizing section 48 of the numerical control section 16 to recognize the current positions of the spindle axis 12 and the feed axis 14 while a return operation in the tapping process is being controlled. In this case, when the numerical control section 16 determines that the tapping process has reached the target thread depth, the feed-axis command outputting section 28 obtains a total return-feed amount D0' (mm) of the feed axis 14 corresponding to the target thread depth and a thread pitch Pt (mm/rev), from the command values of the tapping program P interpreted by the program interpreting section 24, and sends these total return-feed amount D0' (mm) and thread pitch Pt (mm/rev), as the feed axis command CF to feed-axis control section 22. Usually, the total return-feed amount D0' coincides with the total feed amount D0.

The feed-motion control section 44 of the feed-axis control section 22 controls a return-feed motion of the feed axis 14 based on the rotational position FBS of the return motion of the spindle axis 12, the thread pitch Pt and the feed position FBF of the return motion of the feed axis 14. The residual feed amount detecting section 46 of the feed-axis control section 22 detects a residual return-feed amount Dr' of the feed axis 14 from the current position to the return completion position, based on the total return-feed amount D0' and the feed position FBF. The residual rotation-amount detecting section 34 of the spindle-axis control section 18 successively detects the residual return-rotation amount Sr' at the current position of the spindle axis 12 while the spindle axis 12 is being made to perform a returning motion from the target thread depth to the return completion position, and notifies the residual return-rotation amount Sr' to the numerical control section 16 every time it is detected. The residual feed amount detecting section 46 of the feed-axis control section 22 successively detects the residual return-feed amount Dr' at the current position of the feed axis 14 while the feed axis 14 is being made to perform a return-feed motion from the target thread depth to the return completion position, and notifies the residual return-feed amount Dr' to the numerical control section 16 every time it is detected. Further, the feed-axis control section 22 notifies the initial position Di' (feed position FBF) of the feed axis 14 at the start of return motion to the numerical control section 16. The position recognizing section 48 of the numerical control section 16, based on the total return-rotation amount S0' and residual return-rotation amount Sr' of the spindle axis 12, recognizes the current position of the spindle axis 12 as (S0'−Sr') and, based on the total return-feed amount D0', residual return-feed amount Dr' and initial position Di' of the feed axis 14, recognizes the current position of the feed axis 14 as (D0'−Dr'+Di').

Figure 9:
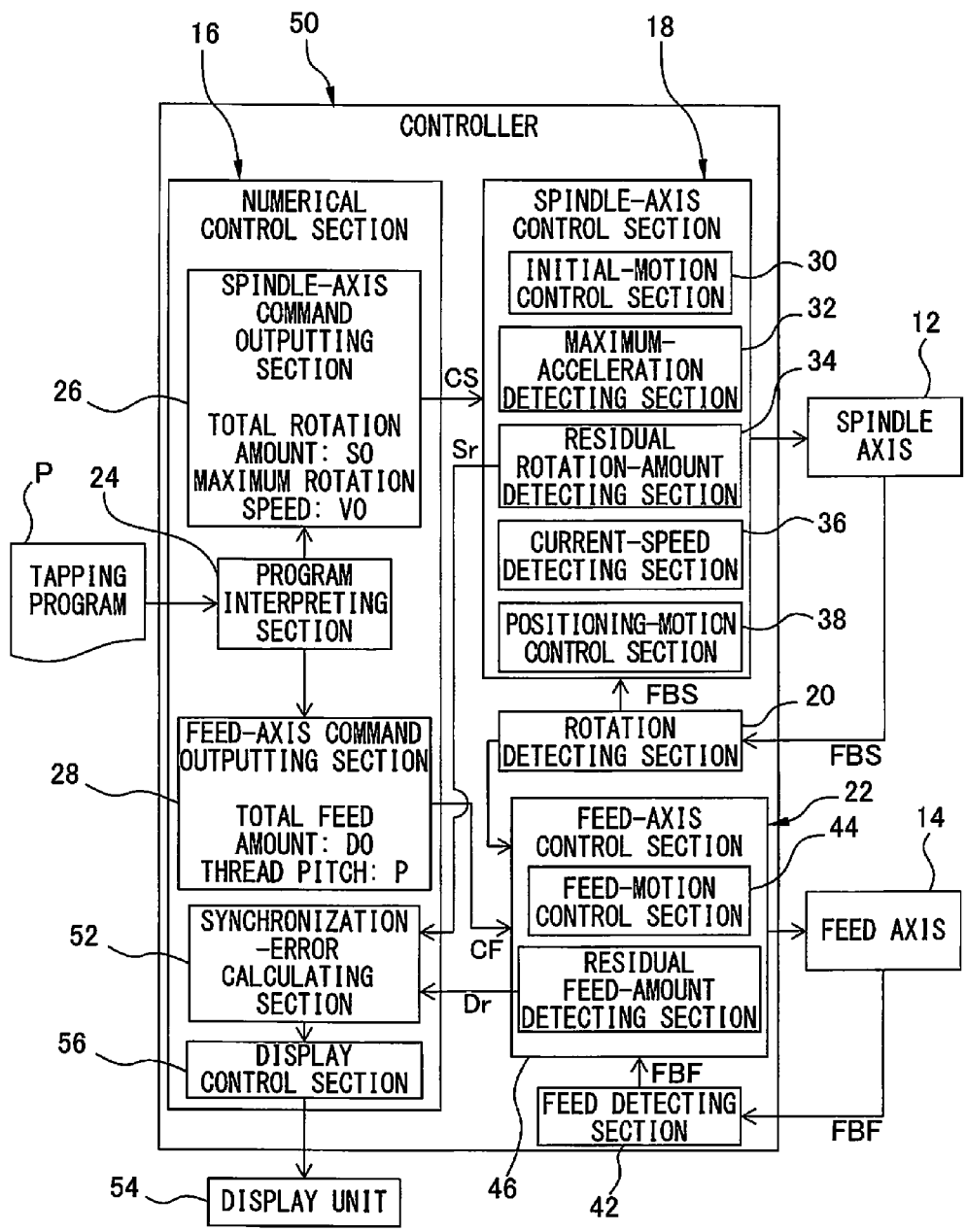
FIG. 9 is a functional block diagram showing the configuration of another modified example of the controller of FIG. 1.

In a tapping process using a machine tool, it is preferable that the controller continuously grasps the synchronization error between the spindle axis and the feed axis during tapping. FIG. 9 shows functional blocks of a configuration of a controller 50 according to a modified example in which a function of recognizing the synchronization error between the spindle axis and the feed axis is added. The controller 50 includes the same configuration as that of the controller 10 in FIG. 1 except that a synchronization error recognizing function is added. Corresponding components are denoted by the same reference numerals and detailed description thereof is not repeated.

The controller 50 includes a numerical control section 16 configured to prepare a spindle-axis command CS and a feed-axis command based on a tapping program P; a spindle-axis control section 18 configured to control a rotational motion of the spindle axis 12 in accordance with the spindle-axis command CS; a rotation detecting section 20 configured to detect a rotational position of the spindle axis 12; a feed-axis control section 22 configured to control a feed motion of the feed axis 14 in accordance with the feed-axis command CF, based on the rotational position detected by the rotation detecting section 20; and a feed detecting section 42 configured to detect the feed position of the feed axis 14. A feed-axis command outputting section 28 of the numerical control section 16, before start of a tapping process, obtains from the command values from the tapping program P, interpreted by a program interpreting section 24, a total feed amount D0 (mm) of the feed axis 14 corresponding to a target thread depth and a thread pitch Pt (mm/rev), and sends the total feed amount D0 and the thread pitch Pt as the feed-axis command CF to the feed axis control section 22. In this way, the feed-axis command CF does not include either the position command or the acceleration and deceleration command for performing feed motion of the feed axis 14 to the target thread depth.

The feed-axis control section 22 includes a feed-motion control section 44 configured to control a feed motion of the feed axis 14 based on the rotational position FBS of the spindle axis 12 detected by the rotation detecting section 20, the thread pitch Pt and the feed position (a feedback value, which will be referred to hereinafter as feed position FBF) of the feed axis 14 detected by the feed detecting section 42; and a residual feed amount detecting section 46 configured to detect a residual feed amount Dr of the feed axis 14 from the current position to the target thread depth, based on the total feed amount D0 and the feed position FBF. The residual rotation-amount detecting section 34 of the spindle-axis control section 18 successively detects the residual rotation amount Sr at the current position of the spindle axis 12 while the spindle axis 12 is being made to perform a cutting motion from the process start position to the target thread depth, and notifies the residual rotation amount Sr to the numerical control section 16 every time it is detected. The residual feed amount detecting section 46 of the feed-axis control section 22 successively detects the residual feed amount Dr at the current position of the feed axis 14 while the feed axis 14 is being made to perform a feed motion from the process start position to the target thread depth, and notifies the residual feed amount Dr to the numerical control section 16 every time it is detected.

The numerical control section 16 includes a synchronization error calculating section 52 configured to calculate a synchronization error of a synchronized operation of the spindle axis 12 and the feed axis 14, based on the residual rotation amount Sr, the residual feed amount Dr and the thread pitch Pt. The synchronization error calculating section 52 calculates a synchronization error E between the spindle axis 12 and the feed axis 14 by the following expressions, using the residual rotation amount Sr (rev) of the spindle axis 12 notified by the spindle-axis control section 18, the residual feed amount Dr (mm) of the feed axis 14 notified by the feed axis control section 22 and the thread pitch Pt (mm/rev).

When the synchronization error E is calculated in terms of the rotation amount of the spindle axis 12:

$$E(\text{rev})=Sr-Dr/Pt$$

When the synchronization error E is calculated in terms of the feed amount of the feed axis 14:

$$E(\text{mm})=Sr\times Pt-Dr$$

In the controller 50 having the above configuration, even if the numerical control section 16 is configured so as not to perform feedback control to the spindle axis 12 and the feed axis 14, the synchronization error calculating section 52 of numerical control section 16 can determine the synchronization error E between the spindle axis 12 and the feed axis 14. Therefore, according to the controller 50, the numerical control section 16 as the superior controller of the spindle-axis control section 18 and feed-axis control section 22 for performing feedback control can constantly grasp or control the synchronization error E between the spindle axis 12 and the feed axis 14 during execution of tapping, hence can improve reliability of tapping process control.

The numerical control section 16 of the controller 50 can include a display controlling section 56 for displaying the synchronization error E determined by the synchronization error calculating section 52 on a display unit 54. This configuration allows the operator to successively confirm the synchronization error E and hence take quick action in response to the synchronization error E.

In the controller 50, it is similarly possible for the synchronization error calculating section 52 of the numerical control section 16 to calculate the synchronization error E between the spindle axis 12 and the feed axis 14. In this case, when the numerical control section 16 determines that the tapping process reaches the target thread depth, the feed-axis command outputting section 28 obtains the total return-feed amount D0' (mm) of the feed axis 14 corresponding to the target thread depth and the thread pitch Pt (mm/rev), from the command values of the tapping program P interpreted by the program interpreting section 24, and sends these total return-feed amount D0' (mm) and thread pitch Pt (mm/rev), as the feed axis command CF to feed-axis control section 22. Usually, the total return-feed amount D0' coincides with the total feed amount D0.

The feed-motion control section 44 of the feed-axis control section 22 controls a return-feed motion of the feed axis 14 based on the rotational position FBS of the return motion of the spindle axis 12, the thread pitch Pt and the feed position FBF of the return motion of the feed axis 14. The residual feed amount detecting section 46 of the feed-axis control section 22 detects a residual return-feed amount Dr' of the feed axis 14 from the current position to the return completion position, based on the total return-feed amount D0' and the feed position FBF. The residual rotation-amount detecting section 34 of the spindle-axis control section 18 successively detects the residual return-rotation amount Sr' from the current position of the spindle axis 12 while the spindle axis 12 is being made to perform a returning motion from the target thread depth to the return completion position, and notifies the residual return-rotation amount Sr' to the numerical control section 16 every time it is detected. The residual feed amount detecting section 46 of the feed-axis control section 22 successively detects the residual return-feed amount Dr' from the current position of the feed axis 14 while the feed axis 14 is being made to perform a return-feed motion from the target thread depth to the return completion position, and notifies the residual return-feed amount Dr' to the numerical control section 16 every time it is detected. The synchronization error calculating section 52 of the numerical control section 16, using the residual return-rotation amount Sr' of the spindle axis 12, the residual return-feed amount Dr' of the feed axis 14 and the thread pitch Pt, calculates the synchronization error E between the spindle axis 12 and the feed axis 14 (E=Sr'−Dr'/Pt or E=Sr'×Pt−Dr').

Figure 10:
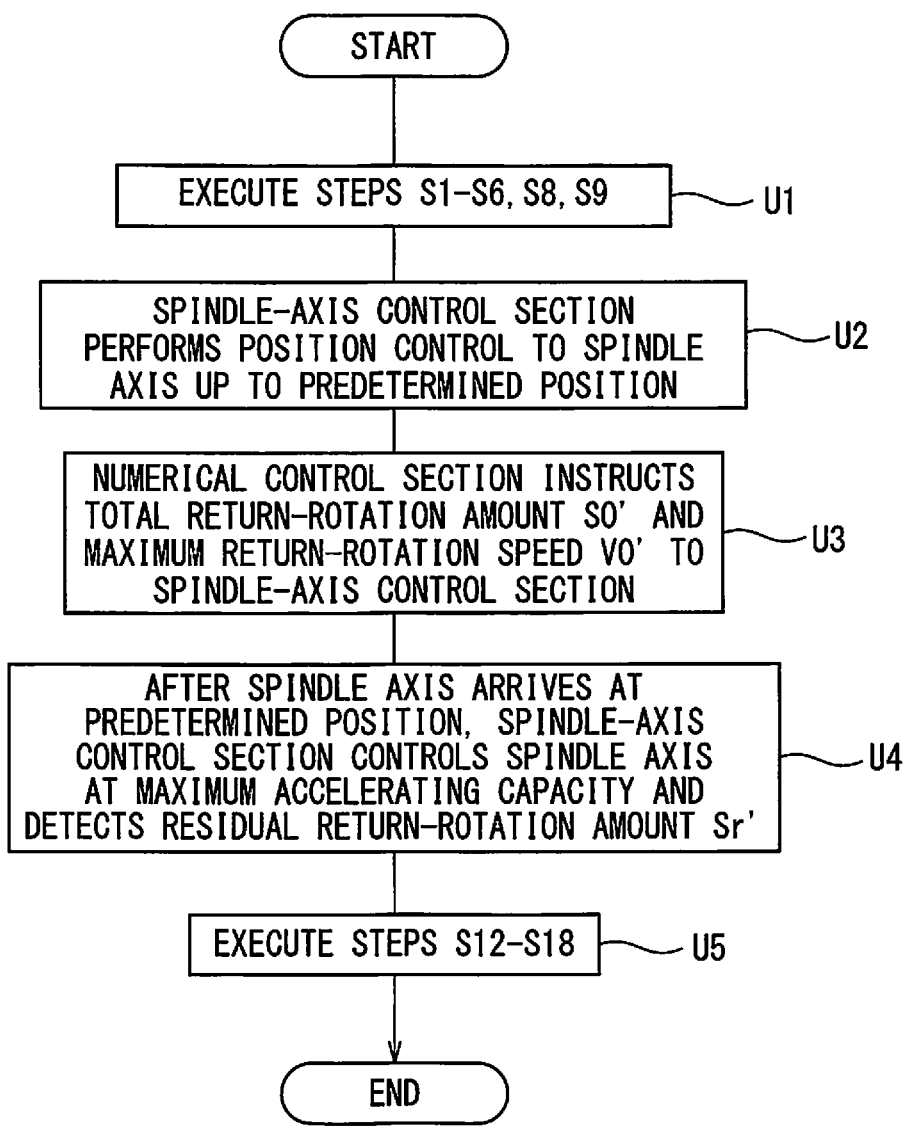
FIG. 10 is a flow chart for showing a cutting and return motion control method for a tapping process, which is another embodiment of a machine tool control method.
Figure 11:
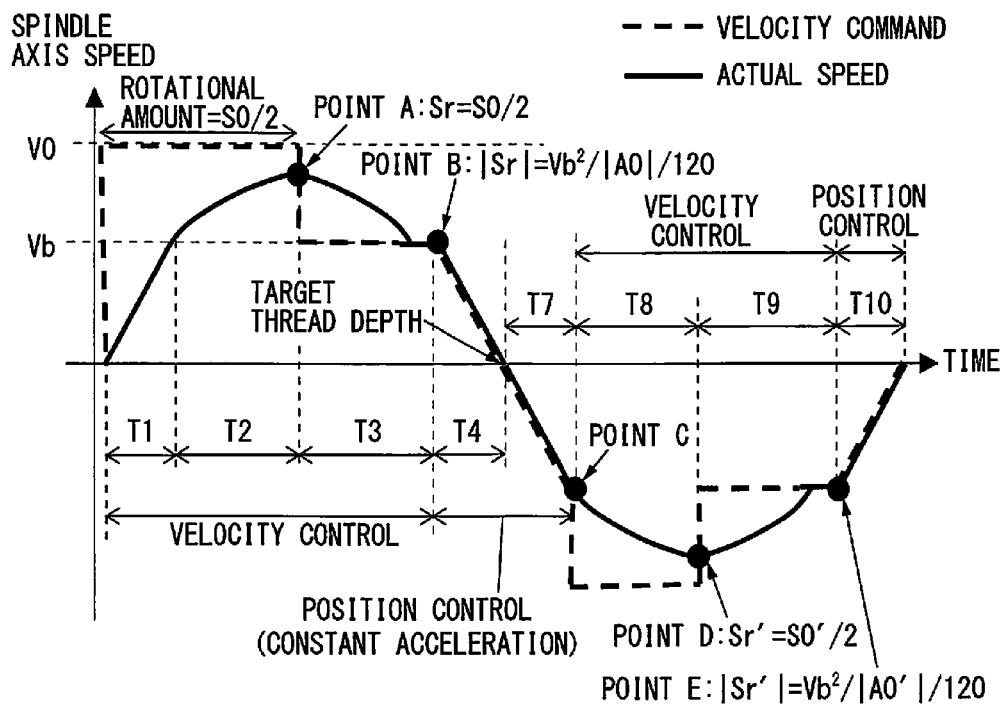
FIG. 11 is a diagram showing one example of the motion of the spindle axis in the embodiment shown in FIG. 10.
Figure 12:
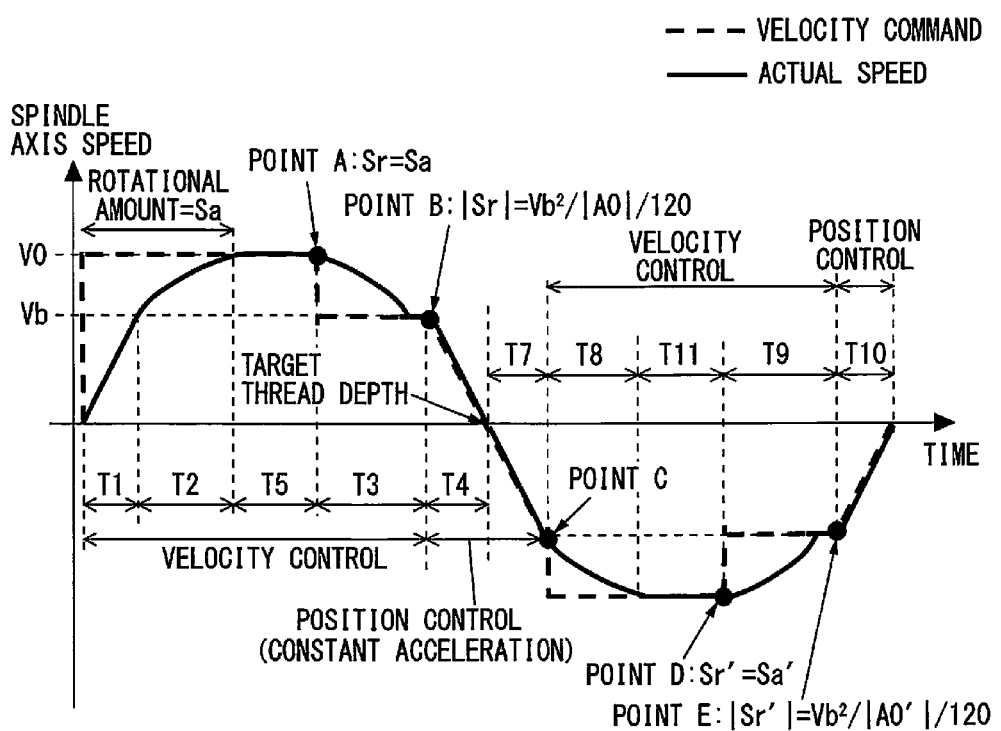
FIG. 12 is a diagram showing another example of the motion of the spindle axis in the embodiment shown in FIG. 10.

FIG. 10 shows a cutting and return motion control method of the spindle axis 12 in a tapping process as another embodiment of a machine tool control method executable by the controller 10 in FIG. 1. FIGS. 11 and 12 show two examples of the operation of the spindle axis 12 in the embodiment of FIG. 10. Now, referring to FIGS. 1, 2, 7 and 10 to 12, the machine tool control method (cutting and return motion control method in a tapping process) of another embodiment, as well as the configuration of the controller 10 according to the same embodiment for performing this method, will be described. Also in the controller 40 (FIG. 8) and the controller 50 (FIG. 9) of the above-described modified examples, the cutting and return motion control method in a tapping process described hereinafter can be carried out.

Giving an outline, in the embodiment shown in FIGS. 10 to 12, while the spindle axis 12 is moved from the process start position (rotational position) to the target thread depth (rotational position), the controller 10 performs the same steps as in the cutting motion control method of the tapping process shown in FIG. 2 to control the cutting motion of the spindle axis 12. Then, the spindle-axis control section 18 (positioning-motion control section 38) of the controller 10 is configured to perform an accelerated inverse rotation of the spindle axis 12 up to the predetermined rotational position at the maximum acceleration A0' (negative value) of inverse rotation equal to the maximum deceleration A0 (negative value) in deceleration rotation at maximum capacity, instead of stopping the spindle axis 12 at the target thread depth (or without making acceleration zero) when the spindle axis 12 has reached the target thread depth. After the accelerated inverse rotation of the spindle axis 12 up to the predetermined rotational position, the controller 10 executes the same steps as in the return-operation control method of the tapping process shown in FIG. 7 to control the return operation of the spindle axis 12. The configuration of this embodiment will be detailed below. However, the description of the components corresponding to those in FIGS. 2 and 7 will be omitted as appropriate.

As shown in FIG. 10, first, the controller 10 executes steps S1 to S6, S8 and S9 shown in FIG. 2 (step U1). Referring now to FIG. 11, a speed-time curve is provided to depict the motion of the spindle axis 12 when the residual rotation amount Sr has reached the half of the total rotation amount S0 before the current speed Vc during the cutting motion has reached the maximum rotation speed V0 (in the case where judgments at steps S3 and S4 in FIG. 2 are both YES). The motions of the spindle axis 12 in time periods T1, T2, T3 and T4 in the speed-time curve in FIG. 11 correspond to the motions of the spindle axis 12 in time periods T1, T2, T3 and T4 in the above-described speed-time curve in FIG. 3. In other words, as shown in FIG. 11, an accelerated rotation of the spindle axis 12 at maximum capacity is performed in time periods T1 and T2. At the point of time A when the residual rotation amount Sr becomes equal to half of the total rotation amount S0, the motion of the spindle axis 12 changes from accelerated rotation to decelerated rotation. The rotation of spindle axis 12 is decelerated at maximum capacity in time period T3, and position control to the spindle axis 12 is performed in time period T4.

As the controller 10 performs step U1 (steps S1 to S2 to S3 to S4 to S5 to S6, in this order, in FIG. 2), the spindle axis 12 performs the same operation in time periods T1, T2, T3 and T4 shown in FIG. 11, as that in time periods T1, T2, T3 and T4 shown in FIG. 3. However, when the spindle-axis control section 18 (positioning-motion control section 38) determines at step S6 in FIG. 2 that the absolute value |Sr| of the residual rotation amount at the current position of the spindle axis 12 satisfies $|Sr|=Vb^2/|A0|/120$ (i.e., the rotational position of the spindle axis 12 has reached the point B), the controller prepares at step U2 (FIG. 10) a command that continuously makes the spindle axis 12 perform an accelerated inverse rotation at the maximum acceleration A0', identical to the maximum deceleration A0, to the predetermined rotation position (corresponding to the point C in FIG. 11), after making the spindle axis 12 perform a decelerated rotation at the maximum deceleration A0 to reach the point corresponding to Sr=0 (i.e., the target thread depth), and performs position control to the spindle axis 12 in accordance with this command.

As shown in FIG. 11, the spindle axis 12, in accordance with the command from the spindle-axis control section 18 (positioning-motion control section 38), performs a cutting motion from the point B toward the target thread depth with its rotation decelerated at the maximum deceleration A0, and reaches the target thread depth when Sr becomes 0 (time period T4). The moment the spindle axis 12 reaches the target thread depth, the current speed Vc of the spindle axis 12 is equal to zero, but the spindle axis 12, in accordance with the command from the spindle-axis control section 18 (positioning-motion control section 38), keeps the maximum deceleration A0, or rotates in the inverse direction at the maximum acceleration A0', performs an accelerated inverse rotation that gradually increases the current speed Vc (negative value), to thereby perform a return motion from the target thread depth toward the point C over time period T7. In this way, in time period T4 in which the spindle axis 12 moves from the point B to the target thread depth and in time period T7 in which the spindle axis moves from the target thread depth to the point C, the spindle-axis control section 18 performs position control to the spindle axis 12 (step U2) and continuously moves the spindle axis 12 at the constant acceleration A0 (the velocity command of a constant acceleration is shown by the broken line). The spindle axis 12 takes a current speed Vc of 0 at the target thread depth. This means that the axis is at rest at that instance of time but does not mean that the axis continuously stops at the target thread depth.

The position of the point C of the spindle axis 12 can be set arbitrarily. For example, as shown in FIG. 11 the point C can be set at the point B, i.e., the same point where the deceleration rotation at the maximum deceleration A0 was started during the cutting motion. The point C in this case is the position that is reached from the target thread depth by inverse rotation in a rotation amount corresponding to $|Sr|=Vb^2/|A0|/120$. According to this configuration, as shown in FIG. 11, the cutting motion (time periods T1 to T4) of the spindle axis 12 from the process start to reach the target thread depth via the point B, and the return motion (time periods T7 to T10) from the target thread depth to reach the return completion position via the point C, can be represented by practically the same speed-time curve except that the sign of the speed is opposite. In other words, the spindle axis 12 performs an accelerated inverse rotation at the constant acceleration A0 in time period T7 as in time period T1 where the spindle axis performs an accelerated rotation at the constant acceleration A0. Strictly speaking, however, because of control characteristics, the maximum deceleration A0 (time period T4) during the decelerated rotation at maximum capacity by position control is slightly suppressed compared to the maximum acceleration A0 (time period T1) during the accelerated rotation at maximum capacity by velocity control. As a result, the maximum acceleration A0' of inverse rotation in time period T7 also tends to be slightly lowered compared to the maximum acceleration A0 in time period T1.

While the spindle-axis control section 18 is controlling the rotational motion of the spindle axis 12 from the process start position to the target thread depth, the feed-axis control section 22 controls a feed motion of the feed axis 14 so as to follow the motion of the spindle axis 12, based on the rotational position FBS of the spindle axis 12. While the spindle-axis control section 18 is executing the process at steps U1 and U2, the numerical control section 16 monitors the residual rotation amount Sr notified from the spindle-axis control section 18 and determines that the tapping process has reached the target thread depth when the residual rotation amount Sr becomes equal to or less than a first predetermined value (a very small value close to zero). Then, the numerical control section 16 (spindle-axis command outputting section 26), after determining that the tapping process has reached the target thread depth, obtains the total return-rotation amount S0' and the maximum return-rotation speed V0' of the spindle axis 12 during the period when the spindle axis operates from the target thread depth to the return completion position, from the command values of the tapping program P interpreted by the program interpreting section 24 in parallel with step U2 and sends the total return-rotation amount S0' and the maximum return-rotation speed V0' as the spindle axis command CS to the spindle-axis control section 18 at step U3.

After the spindle axis 12 has reached the predetermined rotation position (point C), at step U4 the spindle-axis control section 18 (initial-motion control section 30) accelerates rotation of the spindle axis 12, aiming at the maximum return-rotation speed V0' as a target speed, by the maximum capacity using the maximum permissible current of the drive source to perform a return motion from the predetermined rotational position (point C) to the return completion position. The spindle-axis control section 18 (residual rotation-amount detecting section 34), based on the total return-rotation amount S0' and the rotational position FBS, successively detects the residual return-rotation amount Sr' of the spindle axis 12 from the current position to the return completion position. The detected residual return-rotation amount Sr' is notified by the spindle-axis control section 18 to numerical control section 16 every time it is detected.

Next, the controller 10 executes steps S12 to S18 shown in FIG. 7 (step U5). In the operation example in FIG. 11, the spindle-axis control section 18 (current-speed detecting section 36) successively detects the current speed Vc' of inverse rotation based on the rotational position FBS during the decelerated rotation at maximum capacity (time period T8), and judges whether or not the current speed Vc' has reached the maximum return-rotation speed V0' every time it is detected (step S12). When Vc' has not yet reached V0', the spindle-axis control section 18 judges whether or not the residual return-rotation amount Sr' is equal to or less than the half of the total return-rotation amount S0' (step S13). When Sr' is equal to or less than the half of S0', the spindle-axis control section 18 makes the spindle axis 12 perform a decelerated inverse rotation at maximum capacity using the maximum permissible current of the drive source to continue return motion (step S14).

In the example shown in FIG. 11, since the current speed of inverse rotation of the spindle axis 12 exceeds Vb (negative value) after its arrival at the predetermined rotation position (point C), the acceleration of inverse rotation of the spindle axis 12 gradually decreases from A0' in the accelerated inverse rotation at maximum capacity, due to the characteristics of the spindle motor, for example (time period T8). At the point of time D when the residual return-rotation amount Sr' reaches the half of the total return-rotation amount S0' (i.e., the rotation amount from the target thread depth reaches the half of the total return-rotation amount S0'), the motion of the spindle axis 12 changes from accelerated inverse rotation to decelerated inverse rotation so that the spindle axis 12 performs a decelerated inverse rotation at maximum capacity in time period T9. In this way, in time periods T8 to T9, the spindle-axis control section 18 performs velocity control to the spindle axis 12 (the stepwise velocity command is illustrated by the broken line).

Next, the spindle-axis control section 18 (positioning-motion control section 38) judges whether or not the absolute value |Sr'| of the residual return-rotation amount Sr' at the current position of the spindle axis 12 satisfies $|Sr'|=Vb^2/|A0'|/120$ (i.e., whether or not the rotational position of the spindle axis 12 has reached the point E (FIG. 11)) (step S15). When $|Sr'|=Vb^2/|A0'|/120$ is satisfied, the spindle-axis control section 18 (positioning-motion control section 38) prepares a command for making the spindle axis 12 perform a decelerated inverse rotation at the maximum deceleration A0' (the value corresponding to the maximum acceleration A0' of inverse rotation in time period T7) and stop at the point where Sr'=0 (i.e., the return completion position), and performs position control to the spindle axis 12 in accordance with this command (step S16). The spindle axis 12, in accordance with the command from the spindle-axis control section 18 (positioning-motion control section 38), performs a decelerated inverse rotation at the maximum deceleration A0' to return to the return completion position and stops at the point of time when Sr'=0. In this way, in time period T10

(FIG. 11) from the point E until the arrival at the return completion position, the spindle-axis control section 18 performs position control to the spindle axis 12 (the velocity command of a constant acceleration is shown by the broken line).

While the spindle-axis control section 18 is controlling the inverse-rotational motion of the spindle axis 12 from the target thread depth to the return completion position, the feed-axis control section 22 controls an inverse feed motion of the feed axis 14 so as to follow the motion of the spindle axis 12, based on the rotational position FBS of the spindle axis 12. While the spindle-axis control section 18 is executing the process from step U3 to step U5, the numerical control section 16 monitors the residual return-rotation amount Sr' notified from the spindle-axis control section 18 and determines that the return motion is completed and the tool has been pulled out from the workpiece when the residual return-rotation amount Sr' becomes equal to or less than a second predetermined value (a very small value close to zero).

FIG. 12 shows a speed-time curve of the motion of the spindle axis 12 when the current speed Vc reaches the maximum rotation speed V0 before the residual rotation amount Sr reaches the half of the total rotation amount S0 during the cutting motion (in the case where judgment at step S3 in FIG. 2 is No). The motion of the spindle axis 12 in time periods T1, T2, T3, T4 and T5 in the speed-time curve in FIG. 12 corresponds to the motion of the spindle axis 12 in time periods T1, T2, T3, T4 and T5 in the speed-time curve in FIG. 4 described above. In other words, as shown in FIG. 12 the spindle axis 12 is made to perform an accelerated rotation at maximum capacity in time periods T1 and T2 so that the current speed Vc of the spindle axis 12 reaches the maximum rotation speed V0, then the spindle axis 12 rotates at the fixed speed V0 over time period T5 to continue tapping, and the motion of the spindle axis 12 changes from accelerated rotation to decelerated rotation at the point of time A when the residual rotation amount Sr becomes equal to the acceleration rotation amount Sa, so that the spindle axis 12 is made to perform a decelerated rotation at maximum capacity in time period T3 and position control to the spindle axis 12 is performed in time period T4.

As the controller 10 performs step U1 (steps S1 to S2 to S3 to S8 to S9 to S5 to S6, in this order, in FIG. 2), the spindle axis 12 operates in time periods T1, T2, T3, T4 and T5 shown in FIG. 12, in the same way as the operation in time periods T1, T2, T3, T4 and T5 shown in FIG. 4. However, when the spindle-axis control section 18 (positioning-motion control section 38) determines at step S6 in FIG. 2 that the absolute value |Sr| of the residual rotation amount at the current position of the spindle axis 12 satisfies $|Sr|=Vb^2/|A0|/120$ (i.e., the rotational position of the spindle axis 12 has reached the point B), the controller prepares at step U2 (FIG. 10) a command that continuously makes the spindle axis 12 perform an accelerated inverse rotation at the maximum acceleration A0', identical to the maximum deceleration A0, to the predetermined rotation position (corresponding to the point C in FIG. 12), after making the spindle axis 12 perform a decelerated rotation at the maximum deceleration A0 to reach the point corresponding to Sr=0 (i.e., the target thread depth), and performs position control to the spindle axis 12 in accordance with this command.

As shown in FIG. 12, the spindle axis 12, in accordance with the command from the spindle-axis control section 18 (positioning-motion control section 38), performs a cutting motion from the point B toward the target thread depth with its rotation decelerated at the maximum deceleration A0, and reaches the target thread depth when Sr becomes 0 (time period T4). The moment the spindle axis 12 reaches the target thread depth, the current speed Vc of the spindle axis 12 is equal to zero, but the spindle axis 12, in accordance with the command from the spindle-axis control section 18 (positioning-motion control section 38), keeps the maximum deceleration A0, or rotates in the inverse direction at the maximum acceleration A0', performs an accelerated inverse rotation that gradually increases the current speed Vc (negative value), to thereby perform a return motion from the target thread depth toward the point C over time period T7. In this way, in time period T4 in which the spindle axis 12 moves from the point B to the target thread depth and in time period T7 in which the spindle axis moves from the target thread depth to the point C, the spindle-axis control section 18 performs position control to the spindle axis 12 (step U2) and continuously moves the spindle axis 12 at the constant acceleration A0 (the velocity command of the constant acceleration is shown by the broken line). The operations of the spindle axis 12 in time periods T4 and T7 are the same as the operations of the spindle axis 12 in time periods T4 and T7 shown in FIG. 11.

Next, the controller 10 executes steps U3 and U4 in FIG. 10. At step U5, the spindle axis 12 is made to perform an accelerated inverse rotation at maximum capacity in time period T8 as shown in FIG. 12, so that the current speed Vc' (negative value) of the spindle axis 12 reaches the maximum return-rotation speed V0' (negative value), then the spindle axis 12 is continuously rotated in reverse at the fixed speed V0' to continue return motion over time period T11. At the point of time D when the residual return-rotation amount Sr' becomes equal to the acceleration rotation amount Sa', the motion of the spindle axis 12 changes from accelerated rotation to decelerated rotation, and the spindle axis 12 is made to perform a decelerated inverse rotation at maximum capacity in time period T9. In time period T10, the spindle axis 12 is position controlled to the return completion position. The motion of the spindle axis 12 in time periods T8, T9 and T10 is the same as the motion of the spindle axis 12 in time periods T8, T9 and T10 shown in FIG. 11.

While the spindle-axis control section 18 is controlling the inverse-rotational motion of the spindle axis 12 from the target thread depth to the return completion position, the feed-axis control section 22 controls an inverse feed motion of the feed axis 14 so as to follow the motion of the spindle axis 12, based on the rotational position FBS of the spindle axis 12. While the spindle-axis control section 18 is executing the process from step U3 to step U5, the numerical control section 16 monitors the residual return-rotation amount Sr' notified from the spindle-axis control section 18 and determines that the return motion is completed and the tool has been pulled out from the workpiece when the residual return-rotation amount Sr' becomes equal to or less than a second predetermined value (a very small value close to zero).

Similarly to the controllers 10, 40 and 50 of the embodiment shown in FIGS. 1 to 9, the controller 10 according to the embodiment shown in FIGS. 10 to 12 is configured so that, when the spindle axis 12 is made to perform a cutting motion from the process start position to the target thread depth, the numerical control section 16 sends the total rotation amount S0 and the maximum rotation speed V0 of the spindle axis 12 alone as a spindle axis command CS to the spindle-axis control section 18; the spindle-axis control section 18, in accordance with this spindle axis command CS, performs the cutting motion by accelerating the spindle axis 12 with the maximum power using the maximum permissible current, aiming at the maximum rotation speed V0; and the spindle-axis control section, based on the maximum acceleration A0 during the acceleration period, the residual rotation amount Sr and current speed Vc of the spindle axis 12, which are detected successively, decelerates the spindle axis 12 at the maximum deceleration A0 to thereby continue the cutting motion to the target thread depth in the shortest time, and achieve arrival at the target thread depth. Therefore, according to the controller 10, it is no longer necessary to perform parameter setting, adjustment and others to prepare acceleration and deceleration commands for the numerical control section 16 to deal with the output characteristics of the spindle axis 12, hence, it is possible with the simpler configuration to shorten the cycle time of tapping by performing acceleration and deceleration control that can maximize the acceleration capacity of the spindle axis 12.

The controller 10 according to the embodiment shown in FIGS. 10 to 12 is configured so that, when the spindle axis 12 is made to perform a return motion from the target thread depth to the return completion position, the spindle axis 12 will not be stopped at the target thread depth at the end of cutting (in other words, the spindle axis is rotated at non-zero acceleration) but is made to perform accelerated inverse rotation at the maximum acceleration A0' (negative value) of inverse rotation identical to the maximum deceleration A0 (negative value) so that the spindle axis 12 is position controlled to the predetermined rotation position. With this configuration, the acceleration of the spindle axis 12 is unchanged when the operation of the spindle axis 12 is changed from the cutting motion to the return motion, so that no mechanical and structural impacts arising in the spindle axis 12 due to change in acceleration as well as increase of the synchronized error arising between the spindle axis 12 and the feed axis 14 due to change in acceleration, can be prevented. In the return operation of the spindle axis 12 shown in FIG. 7, since velocity control to the spindle axis 12 is performed such that the spindle axis 12 is once stopped (in other words, the acceleration is set at zero) at the target thread depth at the end of the cutting motion, then is made to perform accelerated inverse rotation at maximum power from the target thread depth, there is a risk that mechanical and structural impacts and synchronized error increase due to switching from the velocity command (position control) of a constant acceleration to the step-wise velocity command (velocity control) and/or due to change of friction force from static friction to kinetic friction between the components in the machine.

The controller 10 according to the embodiment shown in FIGS. 10 to 12 is configured so that, after the spindle axis 12 is made to perform an accelerated inverse rotation by positional control up to a predetermined position, a return operation is performed by accelerating the spindle axis 12 at the maximum power in accordance with the spindle axis command CS that includes the total return-rotation amount S0' and the maximum return-rotation speed V0' of the spindle axis 12 alone and was notified by the numerical control section 16 to the spindle-axis control section 18, and the spindle axis 12 is made to decelerate at the maximum deceleration A0' corresponding to the maximum acceleration A0' of inverse rotation at the time of reversing the motion, continue the return motion to the return completion position in the shortest time and stop at the return complete position. Therefore, according to the controller 10, it is no longer necessary to perform parameter setting, adjustment and others to prepare acceleration and deceleration commands for the numerical control section 16 to deal with the output characteristics of the spindle axis 12, it is hence possible with a simpler configuration to shorten the cycle time of tapping by performing acceleration and deceleration control that can maximize the acceleration capacity of the spindle axis 12.

The configuration of the controller 10 of the embodiment shown in FIGS. 10 to 12 can be described as a machine tool control method for controlling a synchronized operation of the spindle axis 12 and the feed axis 14. This control method includes the acts, executed by the controller 10, of obtaining, from a tapping program P, a total rotation amount S0 and a maximum rotation speed V0 of the spindle axis 12 during the period when the spindle axis 12 operates from a process start position to a target thread depth; making the spindle axis 12 perform an accelerated rotation at maximum capacity, with a maximum rotation speed V0 set as a target value, from the process start position toward the target thread depth; detecting a maximum acceleration A0 during the accelerated rotation at maximum capacity, based on the rotational position feedback FBS of the spindle axis 12; detecting a residual rotation amount Sr of the spindle axis 12 during the period when the spindle axis operates from the current position to the target thread depth, based on the total rotation amount S0 and the rotational position feedback FBS; detecting a current speed Vc of the spindle axis 12 based on the rotational position feedback FBS; making the spindle axis 12 perform a decelerated rotation at maximum capacity so as to reach the target thread depth, after the accelerated rotation at maximum capacity, based on the maximum acceleration A0, the residual rotation amount Sr and the current speed Vc; and, making the spindle axis 12 perform an accelerated inverse rotation up to a predetermined rotation position at the maximum acceleration A0' (negative value) of inverse rotation identical to the maximum deceleration A0 (negative value) without stopping the spindle axis 12 at the target thread depth.

In this control method, the controller 10 further includes the acts of obtaining, from the tapping program P, a total return-rotation amount S0' and a maximum return-rotation speed V0' of the spindle axis 12 during the period when the spindle axis 12 operates from the target thread depth to the return completion position; making the spindle axis 12 perform an accelerated inverse rotation at maximum capacity, with the maximum return-rotation speed V0' set as a target value, from the predetermined rotational position toward the return completion position; detecting a residual return-rotation amount Sr' of the spindle axis 12 from the current position to the return completion position, based on the total return-rotation amount S0' and the rotational position feedback FBS of the spindle axis 12; detecting a current speed Vc' of inverse rotation of the spindle axis 12 based on the rotational position feedback FBS; and making the spindle axis 12 perform a decelerated inverse rotation at maximum capacity so as to reach and stop at the return completion position, after the accelerated inverse rotation at maximum capacity, based on the maximum acceleration A0' (negative value) of inverse rotation, the residual return-rotation amount Sr' and the current speed Vc' of inverse rotation.

While the invention has been described with reference to specific embodiments, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller comprising:
a numerical control section configured to prepare a spindle-axis command and a feed-axis command based on a tapping program;
a spindle-axis control section configured to control a rotational motion of the spindle axis in accordance with the spindle-axis command;
a rotation detecting section configured to detect a rotational position of the spindle axis; and
a feed-axis control section configured to control a feed motion of the feed axis in accordance with the feed-axis command, based on the rotational position;
the numerical control section comprising:
a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section;
the spindle-axis control section comprising:
an initial-motion control section configured to make the spindle axis perform an accelerated rotation at maximum capacity using a maximum permissible current of a drive source, from the process start position toward the target thread depth, with the maximum rotation speed set as a target value;
a maximum-acceleration detecting section configured to detect a maximum acceleration during the accelerated rotation at maximum capacity, based on the rotational position;
a residual rotation-amount detecting section configured to detect a residual rotation amount of the spindle axis during a period when the spindle axis operates from a current position to the target thread depth, based on the total rotation amount and the rotational position;
a current-speed detecting section configured to detect a current speed of the spindle axis based on the rotational position; and
a positioning-motion control section configured to make the spindle axis perform a decelerated rotation at maximum deceleration corresponding to the maximum acceleration so as to reach the target thread depth, after the accelerated rotation at maximum capacity, based on the maximum acceleration, the residual rotation amount and the current speed.

2. The controller of claim 1, further comprising a feed detecting section configured to detect a feed position of the feed axis;
wherein the numerical control section comprises:
a feed-axis command outputting section configured to obtain, from the tapping program, a total feed amount and a thread pitch of the feed axis during a period when the feed axis operates from the process start position to the target thread depth, and to send the total feed amount and the thread pitch as the feed-axis command to the feed-axis control section; and
wherein the feed-axis control section comprises:
a feed-motion control section configured to control the feed motion of the feed axis, based on the thread pitch and the rotational position; and
a residual feed-amount detecting section configured to detect a residual feed amount of the feed axis during a period when the feed axis operates from a current position to the target thread depth, based on the total feed amount and the feed position.

3. The controller of claim 2, wherein the numerical control section comprises a position recognizing section configured to recognize the current position of the spindle axis based on the residual rotation amount, and also recognize the current position of the feed axis based on the residual feed amount.

4. The controller of claim 2, wherein the numerical control section comprises a synchronization-error calculating section configured to calculate a synchronization error in the synchronized operation, based on the residual rotation amount, the residual feed amount and the thread pitch.

5. The controller of claim 1, wherein the positioning-motion control section is configured to make the spindle axis stop at the target thread depth.

6. The controller of claim 5, wherein the numerical control section is configured to monitor the residual rotation amount and to judge that a tapping process reaches the target thread depth when the residual rotation amount becomes equal to or less than a first predetermined value;
wherein the spindle-axis command outputting section is configured to obtain, from the tapping program, a total return-rotation amount and a maximum return-rotation speed of the spindle axis during a period when the spindle axis operates from the target thread depth to a return completion position, and to send the total return-rotation amount and the maximum return-rotation speed as the spindle-axis command to the spindle-axis control section;
wherein the initial-motion control section is configured to make the spindle axis perform an accelerated inverse rotation at maximum capacity using a maximum permissible current of a drive source, from the target thread depth toward the return completion position, with the maximum return-rotation speed set as a target value;
wherein the maximum-acceleration detecting section is configured to detect a maximum acceleration of inverse rotation during the accelerated inverse rotation at maximum capacity, based on the rotational position;
wherein the residual rotation-amount detecting section is configured to detect a residual return-rotation amount of the spindle axis during a period when the spindle axis operates from a current position to the return completion position, based on the total return-rotation amount and the rotational position;
wherein the current-speed detecting section is configured to detect a current speed of inverse rotation of the spindle axis based on the rotational position; and
wherein the positioning-motion control section is configured to make the spindle axis perform a decelerated inverse rotation at maximum deceleration corresponding to the maximum acceleration of inverse rotation and stop at the return completion position, after the accelerated inverse rotation at maximum capacity, based on the maximum acceleration of inverse rotation, the residual return-rotation amount and the current speed of inverse rotation.

7. The controller of claim 1, wherein the positioning-motion control section is configured not to make the spindle axis stop at the target thread depth but to make the spindle axis perform an accelerated inverse rotation until the spindle axis reaches a predetermined rotation position, at a maximum acceleration of inverse rotation identical to a maximum deceleration during the decelerated rotation at maximum capacity.

8. The controller of claim 7, wherein the numerical control section is configured to monitor the residual rotation amount and to judge that a tapping process reaches the target thread depth when the residual rotation amount becomes equal to or less than a first predetermined value;
  wherein the spindle-axis command outputting section is configured to obtain, from the tapping program, a total return-rotation amount and a maximum return-rotation speed of the spindle axis during a period when the spindle axis operates from the target thread depth to a return completion position, and to send the total return-rotation amount and the maximum return-rotation speed as the spindle-axis command to the spindle-axis control section;
  wherein the initial-motion control section is configured to make the spindle axis perform an accelerated inverse rotation at maximum capacity using a maximum permissible current of a drive source, from the predetermined rotation position toward the return completion position, with the maximum return-rotation speed set as a target value;
  wherein the residual rotation-amount detecting section is configured to detect a residual return-rotation amount of the spindle axis during a period when the spindle axis operates from a current position to the return completion position, based on the total return-rotation amount and the rotational position;
  wherein the current-speed detecting section is configured to detect a current speed of inverse rotation of the spindle axis based on the rotational position; and
  wherein the positioning-motion control section is configured to make the spindle axis perform a decelerated inverse rotation at maximum deceleration corresponding to the maximum acceleration of inverse rotation and stop at the return completion position, after the accelerated inverse rotation at maximum capacity, based on the maximum acceleration of inverse rotation, the residual return-rotation amount and the current speed of inverse rotation.

9. The controller of claim 6, wherein the numerical control section is configured to monitor the residual return-rotation amount and to judge that a return motion is completed when the residual return-rotation amount becomes equal to or less than a second predetermined value.

10. The controller of claim 6, further comprising a feed detecting section configured to detect a feed position of the feed axis;
  wherein the numerical control section comprises:
    a feed-axis command outputting section configured to obtain, from the tapping program, a total return-feed amount and a thread pitch of the feed axis during a period when the feed axis operates from the target thread depth to the return completion position, and to send the total return-feed amount and the thread pitch as the feed-axis command to the feed-axis control section; and
  wherein the feed-axis control section comprises:
    a feed-motion control section configured to control a return-feed motion of the feed axis, based on the thread pitch and the rotational position; and
    a residual feed-amount detecting section configured to detect a residual return-feed amount of the feed axis during a period when the feed axis operates from a current position to the return completion position, based on the total return-feed amount and the feed position.

11. The controller of claim 10, wherein the numerical control section comprises a position recognizing section configured to recognize the current position of the spindle axis based on the residual return-rotation amount, and also recognize the current position of the feed axis based on the residual return-feed amount.

12. The controller of claim 10, wherein the numerical control section comprises a synchronization-error calculating section configured to calculate a synchronization error in the synchronized operation, based on the residual return-rotation amount, the residual return-feed amount and the thread pitch.

13. The controller of claim 4, wherein the numerical control section comprises a display control section configured to make a display unit display the synchronization error.

14. A method of controlling a machine tool, configured to control a synchronized operation of a spindle axis and a feed axis, the method comprising the acts, executed by a controller, of:
  obtaining, from a tapping program, a total rotation amount and a maximum rotation speed of the spindle axis during a period when the spindle axis operates from a process start position to target thread depth;
  making the spindle axis perform an accelerated rotation at maximum capacity using a maximum permissible current of a drive source, from the process start position toward the target thread depth, with the maximum rotation speed set as a target value;
  detecting a maximum acceleration during the accelerated rotation at maximum capacity, based on a rotational position feedback of the spindle axis;
  detecting a residual rotation amount of the spindle axis during a period when the spindle axis operates from a current position to the target thread depth, based on the total rotation amount and the rotational position feedback;
  detecting a current speed of the spindle axis based on the rotational position feedback; and
  making the spindle axis perform a decelerated rotation at maximum deceleration corresponding to the maximum acceleration so as to reach the target thread depth, after the accelerated rotation at maximum capacity, based on the maximum acceleration, the residual rotation amount and the current speed.

* * * * *